United States Patent
Sato et al.

(10) Patent No.: US 7,215,492 B2
(45) Date of Patent: May 8, 2007

(54) IMAGE PICKUP LENS, IMAGE PICKUP APPARATUS, AND MOBILE TERMINAL PROVIDED WITH IMAGE PICKUP APPARATUS

(75) Inventors: Masae Sato, Machida (JP); Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/371,390

(22) Filed: Mar. 9, 2006

(65) Prior Publication Data
US 2006/0209429 A1 Sep. 21, 2006

(30) Foreign Application Priority Data
Mar. 17, 2005 (JP) ............................. 2005-077432

(51) Int. Cl.
G02B 9/34 (2006.01)
(52) U.S. Cl. ...................... 359/773; 359/754
(58) Field of Classification Search ............... 359/773, 359/771, 708, 715, 720
See application file for complete search history.

(56) References Cited
U.S. PATENT DOCUMENTS

| 4,139,266 | A | * | 2/1979 | Koizumi ................ 359/773 |
| 4,161,350 | A | | 7/1979 | Arai |
| 4,303,313 | A | | 12/1981 | Imai et al. |
| 5,748,383 | A | * | 5/1998 | Ohtake ................ 359/683 |
| 6,909,559 | B2 | * | 6/2005 | Nishina ................ 359/772 |
| 2003/0128442 | A1 | * | 7/2003 | Tanaka et al. ............ 359/819 |
| 2004/0218285 | A1 | * | 11/2004 | Amanai ................ 359/773 |
| 2004/0240080 | A1 | | 12/2004 | Matsui et al. |

FOREIGN PATENT DOCUMENTS

| JP | 2002 365530 A | 12/2002 |
| JP | 2004 341013 A | 12/2004 |

* cited by examiner

Primary Examiner—Timothy Thompson
Assistant Examiner—Jerry Fang
(74) Attorney, Agent, or Firm—Cohen Pontani Lieberman & Pavane LLP

(57) ABSTRACT

An image pickup lens for forming a subject image on an photoelectric converter of a solid-sate image pickup element, includes: an aperture stop; a first lens having a positive refractive power; a second lens having a negative refractive power; a third lens having a positive refractive power; and a fourth lens having a negative refractive power. The aperture stop and the first to fourth lenses are arranged in this order from an object side of the image pickup lens, and the image pickup lens satisfies predefined condition.

18 Claims, 14 Drawing Sheets

MERIDIONAL COMA

US 7,215,492 B2

IMAGE PICKUP LENS, IMAGE PICKUP APPARATUS, AND MOBILE TERMINAL PROVIDED WITH IMAGE PICKUP APPARATUS

This application is based on Japanese Patent Application No. 2005-077432 filed on Mar. 17, 2005 in Japanese Patent Office, the entire content of which is hereby incorporated by reference.

FIELD OF THE INVENTION

The present invention relates to an image pickup lens, particularly to an image pickup lens appropriate for a small sized, thin type image pickup apparatus which is housed in the mobile terminal.

BACKGROUND OF THE INVENTION

Conventionally, a small sized and thin type image pickup apparatus is mounted in a mobile terminal which is a small sized thin type electronic device, such as a mobile phone or PDA (Personal Digital Assistant). Hereby, not only an audio information but also an image information can mutually be transferred to a remote place.

As an image pickup element used for these image pickup apparatus, a solid state image pickup element such as CCD (Charge Coupled Device) type image sensor or CMOS (Complementary Metal-Oxide Semiconductor) type image sensor is used.

Recently, following the increase of spreading of these mobile terminals, a device in which the image pickup apparatus using a image pickup element with the large number of pixels is mounted is in the market in order to obtain an image with higher image quality. In this image pickup apparatus, corresponding to the image pickup element with the large number of pixels, there is an apparatus including the image pickup lens formed by a plurality of lenses in order to increase the resolution power.

As an image pickup lens used for a small sized high performance image pickup apparatus provided with such a image pickup element with the large number of pixels, an image pickup lens formed by 4 lenses is proposed because it can be made into higher performance as compared with the image pickup lens formed by 2 lenses to 3 lenses.

As this image pickup lens formed by 4 lenses, the so-called inverted Ernostar type image pickup lens, which aims the high performance and is provided with the first lens having a positive refractive power, the second lens having a negative refractive power, the third lens having a positive refractive power, the fourth lens having the positive refractive power, in the order from the object side, is disclosed (for example, refer to Patent Document 1).

Further, so-called telephoto type image pickup lens which is provided with the first lens having the positive refractive power, the second lens having the negative refractive power, the third lens having the positive refractive power, and the fourth lens having the negative refractive power, in the order from the object side, and aims the down-sizing of the total length of the image pickup lens (the distance on the optical axis from the aperture stop to the image side focal point), is disclosed (for example, refer to Patent Document 2).

[Patent Document 1] Tokkai No. 2004-341013
[Patent Document 2] Tokkai No. 2002-365530

However, the image pickup lens written in the above Patent Document 1 has a disadvantage for a miniaturization, because it is the inverted Ernostar type which has the positive fourth lens, has a principal point placed in the image side of the optical system and has a longer back focus compared with a structure having the negative fourth lens as telephoto type structure. Furthermore, the lens having the negative refractive power is only one in the four lenses. So it is difficult to correct Petzval's sum, and it is difficult to secure the fine performance in the peripheral part of an image plane.

Further, the image pickup lens written in the above Patent Document 2 is the photographing field angle view is narrow, and further, the correction of the aberration is insufficient. So, there is a problem for the purpose to correspond to the high pixelation of the image pickup element.

Furthermore, when all of lenses forming the image pickup lens are formed by plastic lenses molded by the injection molding for having priority to the cost, it is advantageous for the down-sizing and cost-reduction of the image pickup lens. However, because the plastic material has a large refractive index change at the time of the temperature change, the image pickup lens has a disadvantage such that the image point position of the whole body is varied by the temperature when all of lenses are formed of plastic lenses. In the fixed focal point type apparatus, so-called pan-focus type image pickup apparatus, there is a problem that the variation of the image point position at the time of the temperature change can not be disregarded.

SUMMARY OF THE INVENTION

In view of the above-described problem, an object of the present invention is to obtain an image pickup lens which is small-sized and which can secure wide field angle and whose aberrations are finely corrected, whose image point position variation at the time of the temperature change can be suppressed small, and which can correspond to the image pickup element of high pixels.

In order to solve the above-described problems, the structure according to the present invention is an image pickup lens for forming a subject image on the photoelectric converter of a solid-state image pickup element. The structure is an image pickup lens is provided with an aperture stop, the first lens having the positive refractive power, the second lens having the negative refractive power, the third lens having the positive refractive power, and the fourth lens having the negative refractive power, which are arranged in order from the object side of the image pickup lens, and satisfies a predetermined conditional expression.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE INVENTION

Figure 1:
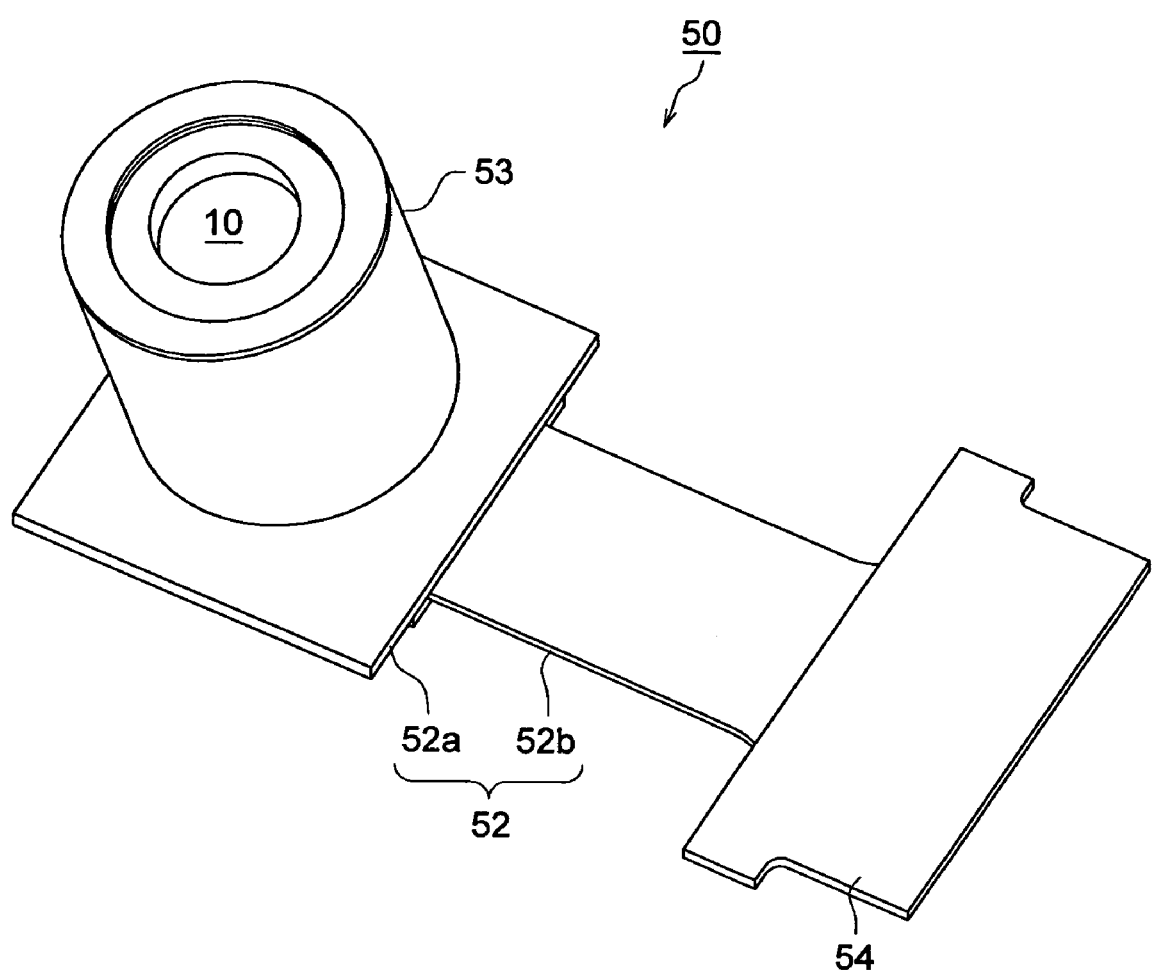
FIG. 1 is a perspective view of an image pickup apparatus according to the present embodiment.

The specific structure according to the present invention will be described below.

1) An image pickup lens for forming a subject image on an photoelectric converter of a solid-sate image pickup element, is provided with an aperture stop; a first lens having a positive refractive power; a second lens having a negative refractive power; a third lens having a positive refractive power; and a fourth lens having a negative refractive power. The aperture stop and the first to fourth lenses are arranged in this order from an object side of the image pickup lens and the image pickup lens satisfies the following expression (1).

$$0.8 < f_1/f < 2.0 \tag{1}$$

Where $f_1$ is a focal length of the first lens, and f is a focal length of a total system of the image pickup lens.

2) The image pickup lens according to item 1, whose third lens satisfies the following expression (2).

$$0.3 < f_3/f < 1.5 \tag{2}$$

Where $f_3$ is a focal length of the third lens, and f is a focal length of a total system of the image pickup lens.

3) The image pickup lens according to item 1 or 2, whose second lens satisfies the following expression (3).

$$0 < (R_3 + R_4)/(R_3 - R_4) < 2.5 \tag{3}$$

Where $R_3$ is a curvature radius of an object side surface of the second lens and $R_4$ is a curvature radius of an image side surface of the second lens.

4) The image pickup lens according to any one of items 1–3, whose fourth lens satisfies the following expression (4).

$$0.15 < R_8/f < 0.5 \tag{4}$$

Where $R_8$ is a curvature radius of an image side surface of the fourth lens, and f is a focal length of a total system of the image pickup lens.

5) The image pickup lens according to any one of items 1–4, whose first lens is formed of a glass material.

6) In the image pickup lens according to any one of items 1–4, each of the second lens, the third lens, and the fourth lens is formed of a plastic material.

7) An image pickup apparatus is provided with: a substrate; a solid-state image pickup element supported by the substrate; a connecting terminal formed on the substrate for receiving or transmitting electrical signal; the image pickup lens according to any one of items 1–6; a casing formed of a shielding material, having an opening for making a light flux from an object side of the image pickup lens enter into the opening, and housing the image pickup lens according to anyone of items 1–6. The substrate, the image pickup lens according to any one of items 1–6, and the casing are formed in one body. A height of the image pickup apparatus along an optical axis of the image pickup lens is 10 mm or less.

8) A mobile terminal is provided with the image pickup apparatus according to item 7.

According to the structure of item 1, providing the telephoto type lens structure allows placing the principal point position of the optical system on the object side of the image pickup lens, and obtaining the image pickup lens whose total length is short. Further, by providing two negative lenses in the lens formed by 4 lenses, the number of the surfaces having the divergent action is increased. It realizes that Petzvals' sum is easily corrected, and that an image pickup lens secures a good image formation performance up to the peripheral part of the image plane, while the lens has a wide field angle.

In addition, providing the aperture stop arranged at most object side of the image pickup lens allows that the exit pupil position can be place to the farther position. It suppresses the principal light incident angle (which is an angle formed between the principal light and the optical axis) of the light flux forming an image on peripheral part of the image pickup surface of the solid-state image pickup element to be small, and secures so-called telecentricity. Further, even when the mechanical shutter is necessary, the structure including the aperture stop arranged at the most object side, can be provided and the image pickup lens whose total length is short, can be obtained.

The expression (1) is an expression for adequately setting the refractive power of the first lens. When the expression is larger than the lower limit, the refractive power of the first lens is not larger than the necessary one, and the spherical aberration or coma can be suppressed small and finely. Further, when the expression is smaller than the upper limit, the refractive power of the first lens is adequately secured, and the total length of the image pickup lens can be reduced and the size-reduction becomes possible.

The expression (1) more preferably satisfies the range of the following expression.

$$0.9 < f_1/f < 1.5$$

The expression (2) of the structure of item 2 is an expression for adequately setting the refractive power of the third lens. When the expression is larger than the lower limit, the refractive power of the third lens is not excessive, and the principal point of the optical system is arranged on the object side of the image pickup lens, and the total length of the image pickup lens can be reduced. On the one hand, when the expression is smaller than the upper limit, the positive refractive power of the third lens can be adequately maintained, as the result, the exit pupil position can be placed further from the solid state image pickup element to the object side. It suppresses the principal light incident angle (which is angle formed between the principal light and the optical axis) of the light flux which forms image on the peripheral part of the image pickup surface of the solid-state image pickup element to be small, and secures so-called telecentricity. As the result, a phenomenon such that an effective aperture efficiency is decreased on the peripheral part of the image pickup surface, which is shading can be suppressed.

The conditional expression (2) more preferably satisfies the range of the following expression.

$$0.3 < f_3/f < 1.0$$

Further, in order to suppress the principal light incident angle of the light flux which forms image on the image pickup surface of the solid-state image pickup element can be suppressed less than 23°, the conditional expression (2) more preferably satisfies the following range.

$$0.3 < f_3/f < 0.7$$

Further, it is preferable that the third lens has the shape of biconvex lens. When the third lens is biconvex lens, each of surfaces of the third lens has convergence action, and the positive refractive power can be secured without the radius of curvature being small. It allows that generation of the high-order aberration is suppressed, and it for becomes a shape without problem also the lens manufacturing.

The expression (3) of the structure of the item 3 is a condition for adequately setting the shape of the second lens. The second lens has the shape such that the image side surface has a negative refractive power stronger than the object side surface within the range of this expression. Because the image pickup lens of the present structure has the structure including the first lens whose positive refractive power is set to be comparatively weak and the third lens whose positive refractive power is set to be comparatively strong, the generation of the coma or chromatic aberration is increased in the third lens. Accordingly, by distributing the stronger negative refractive power to image side surface than the object side surface in the second lens, the generation of the coma or chromatic aberration of the lens total system can be suppressed small.

Further, when the expression is larger than the lower limit, the refractive power of the image side surface of the second lens can be strengthened, and the coma, distortion, astigmatism, and chromatic aberration can be easily corrected. On the one hand, the radius of the object side surface of the second lens becomes soft, and the aberration of the off-axis light flux passing the near of the peripheral edge of this surface can be suppressed. When the expression is smaller than the upper limit, the negative refractive power of the image side surface of the second lens is suppressed not to become too strong, the aberration can be corrected with a good balance. Further, it allows that the radius of curvature of the image side surface is not too small, and that it has the shape without problem for the lens manufacturing.

The expression (3) more preferably satisfies the range of the following expression.

$$0 < (R_3 + R_4)/(R_3 - R_4) < 2.0$$

The expression (4) of the structure of the item 4 is a condition for adequately setting the radius of curvature of the surface on the image side of the fourth lens. When the expression is larger than the lower limit, the radius of curvature is not too small, the interval to the image pickup surface of the solid state image pickup element can be secured, and it becomes the shape without problem for the lens processing. When the expression is smaller than the upper limit, the negative refractive power of the image side surface of the fourth lens can be adequately maintained, and the reduction of the lens total length and the correction of the off-axis aberrations such as the curvature of field or distortion can be finely conducted.

The expression (4) more preferably satisfies the range of the following expression.

$$0.15 < R_8/f < 0.4$$

According to the structure of the item 5 or 6, by forming the first lens having the positive refractive power by the glass material which hardly has refractive index change at the time of temperature change, and by forming the second, third, fourth lenses by the plastic material, the image point position variation at the time of temperature change in the whole system of the image pickup lens can be compensated while plastic lenses are abundantly used. More specifically, the comparatively large positive refractive power is provided to the positive third lens formed of plastic material, and the negative refractive power is shared to two negative lenses of the second lens and the fourth lens. It optimizes the distribution of the refractive power of the plastic lens. Because each of the lenses affects the image point position variation at the time of the temperature change so as to cancel out each of the affected image point position variation, the variation of the image point position at the time of the temperature change in the whole system of the image pickup lens can be suppressed small.

Further, when the first lens is formed of the glass material, it can be structured without exposing the plastic lens, and can avoid the problem such as a flaw to the first lens, it becomes a preferable structure.

Hereupon, a phrase "formed of a plastic material" used in the present invention includes a case where the plastic material is used as the base material, and coating processing is conducted on its surface for the purpose of the reflection prevention, or the increase of the surface hardness. Further, it also includes a case where inorganic microparticles are mixed in the plastic material for the purpose to suppress the temperature change of the refractive index of the plastic material to be small.

According to the structure of the above item 7, a smaller-sized and high image quality image pickup apparatus can be obtained.

Herein, "an aperture for an incident light flux" or "aperture section for the light incidence" is not always limited to an area forming a space such as hole, but includes also a portion formed an area to transmit the incident light from the object side of the image pickup lens. Further, "the height in the image pickup lens along the optical axis of the image pickup apparatus is 10 mm or less" means the total length of the image pickup apparatus along the optical axis provided with: a substrate which supports the solid-state image pickup element and formed the connecting terminal therein for receiving or transmitting electrical signal; an image pickup lens; and a casing housing the image pickup lens, formed of the light shielding material and having an aperture for the light incidence from the object side. Accordingly, for example, when the casing is provided on the surface of the front of the substrate, and the electronic parts are installed on the back surface of the substrate, it means that: the distance from the leading edge part which is the object side of the casing, to the leading edge part of the electronic parts protruded on the back surface, is less than 10 mm.

According to the structure of the item 8, a mobile terminal by which a smaller-sized and high image quality image can be recorded can be obtained.

That is, according to the structure according to the present invention, it can be obtained that an image pickup lens formed by four lenses, in which aberrations are finely corrected although it is smaller than the conventional one, and the high image quality image can be obtained, a problem of focal point movement by the temperature change is solved, an image pickup apparatus provided therewith, and a mobile terminal.

The structure according to the present invention will be detailed by the embodiment below, however, the present invention is not limited to this.

While the preferred embodiments of the present invention have been described using specific terms, such description is for illustrative purposes only, and it is to be understood that changes and variations may be made without departing from the sprit or scope of the appended claims.

Figure 2:
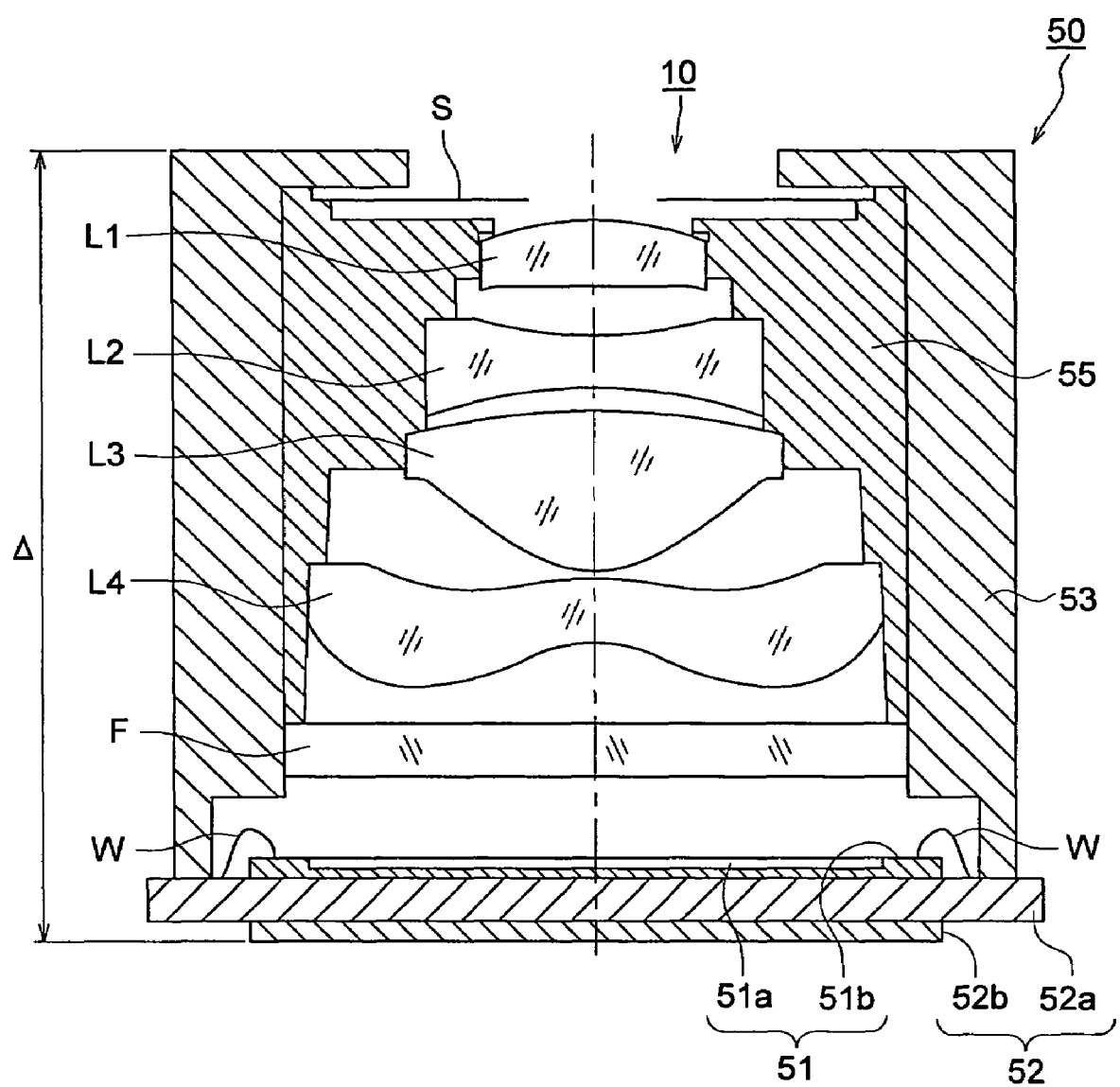
FIG. 2 is a view typically showing the section along the optical axis of an image pickup lens of the image pickup apparatus according to the present embodiment.

FIG. 1 is a perspective view of an image pickup apparatus 50 according to the present embodiment. FIG. 2 is a view typically showing the section along the optical axis of the image pickup lens of the image pickup apparatus 50 according to the present embodiment.

As shown in FIG. 1 or FIG. 2, the image pickup apparatus 50 is provided with: a CMOS type image pickup element 51 as the solid-state image pickup element having the photoelectric conversion section 51a; the image pickup lens 10 for forming the object image to the photoelectric conversion section 51a of this image pickup element 51; a casing 53 as a lens frame formed of the light shielding member having the aperture section for the incident light from the object side of the image pickup lens; supporting substrate 52a supporting the image pickup element 51; and a flexible print substrate 52b having the terminal for the external connection (called also the external connecting terminal) 54 sending and receiving the electric signal. They are integrally formed in one body.

As shown in FIG. 2, in the image pickup element 51, the photoelectric conversion section 51a as the light receiving section in which the pixels (the photoelectric conversion element) are 2-dimensionally arranged at the central part of the surface on the light receiving side, is formed, and on its periphery, the signal processing circuit 51b is formed. This signal processing circuit 51b is structured by: the drive circuit section which successively drives each pixel and obtains the signal charge; the A/D conversion section which converts each signal charge into the digital signal; and the signal processing section which forms the image signal output by using this digital signal.

In the vicinity of the outer edge of the surface on the light receiving side of the image pickup element 51, many pads, not shown, are provided, and connected to the support substrate 52a through the bonding wire W. The image pickup element 51 converts the signal charge from the photoelectric conversion section 51a into the image signal such as the digital YUV signal, and outputs it to a predetermined circuit on the support substrate 52a through the bonding wire W. Y is a brightness signal, U (=R−Y) is the color difference signal between red and the brightness signal, and V (=B−Y) is the color difference signal between blue and the brightness signal.

Hereupon, the image pickup element is not limited to the above-described CMOS type image sensor, but may be the element in which the other element such as CCD is applied.

The substrate 52 is structured by a hard support substrate 52a and a flexible print substrate 52b. The hard support substrate supports the image pickup element 51 and the casing 53 by its one surface. One end of the flexible print substrate 52b is connected to the other surface (the surface opposed to the image pickup element 51) of the support substrate 52a. On the support substrate 52a, many signal transmission pads are provided on the both surfaces of the front and rear surfaces. On the one surface, it is connected to the image pickup element 51 through a bonding wire W, and on the other surface, it is connected to the flexible print substrate 52b.

In the flexible print substrate 52b, as shown in FIG. 1, one end part is connected to the support substrate 52a. It allows that the support substrate 52a and an external circuit which is not shown (for example, a control circuit provided by the higher level of apparatus in which the image pickup apparatus is installed) are connected through the external connecting terminal 54 provided on the other end part. It also allows the flexible print substrate 52b is supplied the voltage for driving the image pickup element 51 or the clock signal from the external circuit and outputs the digital YUV signal to the external circuit. Furthermore, the flexible print substrate 52 has the flexibility, and the intermediate part is deformed, and the degree of freedom is given in the support substrate 52a to the direction or the arrangement of the external connecting terminal 54.

As shown in FIG. 2, the casing 53 is fixedly arranged on a surface of the support substrate 52a which is a surface facing the image pickup element 51 so as to cover the image pickup element 51. That is, one side of the casing 53 facing the image pickup element 51 has a widely opened shape so as to surround the image pickup element 51 and is contacted and fixed to the support substrate 52a. The other side of the casing 53 is formed in a cylindrical shape having a flange with a small opening.

Inside of the casing 53, an infrared ray cut filter F is fixedly arranged between the image pickup lens 10 and the image pickup element 51.

The image pickup lens 10 is provided with, in the order of object side, an aperture stop S, the first lens L1 having the positive refractive power, the second lens L2 having the negative refractive power, the third lens L3 having the positive refractive power, and the fourth lens L4 having the negative refractive power, and it is structured in such a manner that the object image is formed on the photoelectric conversion surface 51a of the image pickup element 51. Hereupon, in FIG. 1, the upper side is the object side, and the lower side is the image side. One-dotted chain line in FIG. 2 is the optical axis common to each lens L1–L4.

Each lens L1–L4 forming the image pickup lens 10 is held by a lens frame 55. The casing 53 includes this lens frame 55 and the image pickup lens 10 held by the lens frame 55, and the lens frame 55 is engaged with the casing 53 at its outer periphery, and is contacted with the flange section having the small opening of the casing 53, and is positioned.

Further, although it is not shown, a fixed stop to cut the unnecessary light may be arranged between lenses L1–L4. Particularly, it is preferable that the stop is arranged between the third lens L3 and the fourth lens L4, or between the fourth lens 4 and the infrared ray cut filter F. The generation of the ghost or flare can be suppressed when a rectangular fixed stop is arranged outside the light path.

Figure 3:
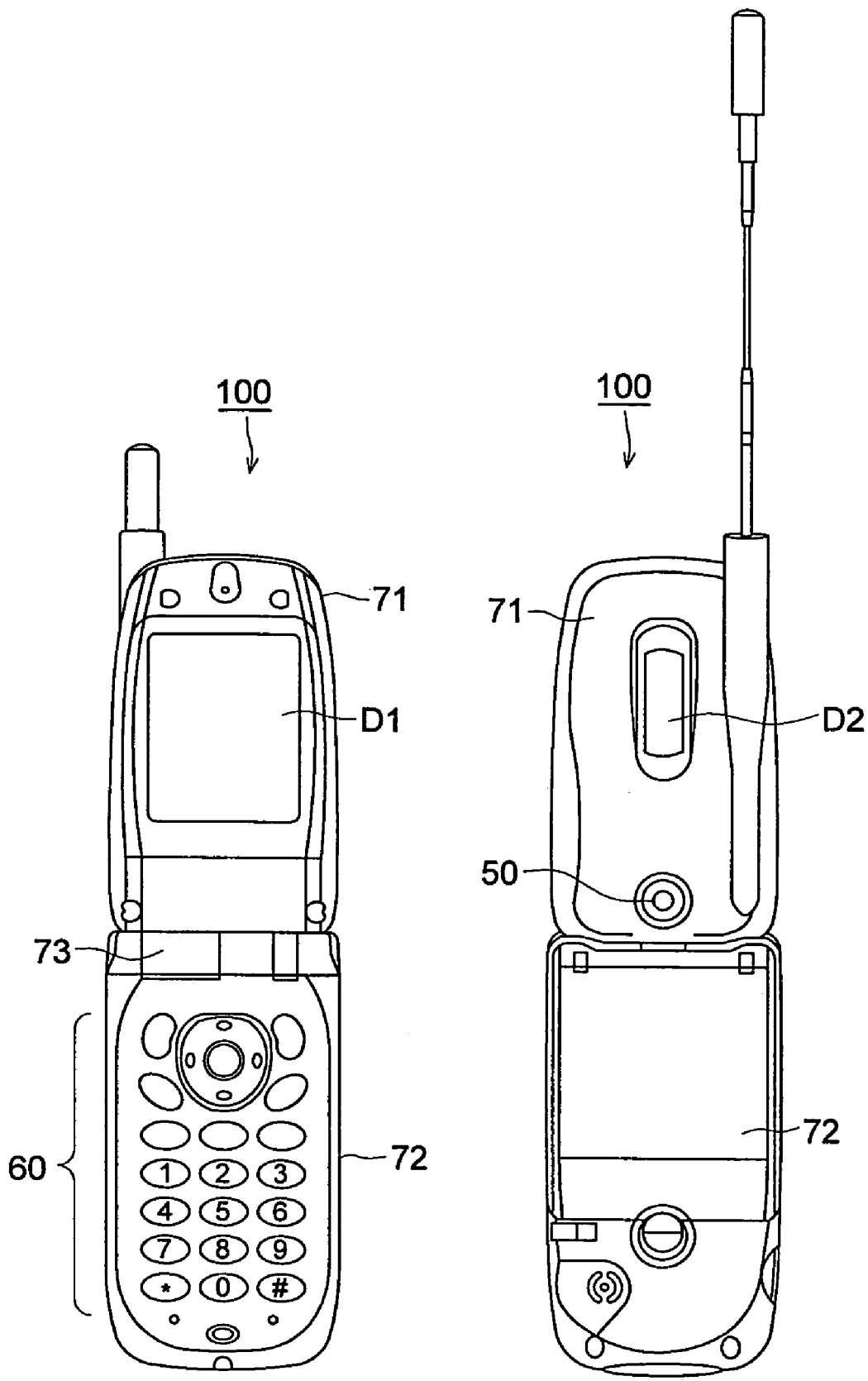
FIG. 3 is an external view of a mobile phone which is an example of a mobile terminal provided with the image pickup apparatus.

FIG. 3 is an appearance view of a mobile phone 100 which is an example of a mobile terminal provided with the image pickup apparatus 50.

In the mobile phone 100 shown in the view, an upper casing 71 as a case provided with the display image screens D1 and D2, and the lower casing 72 provided with operation buttons 60 which is an input section, are connected with each other through a hinge 73. The image pickup apparatus 50 is housed below the display image screen D2 in the upper casing 71, and the image pickup apparatus 50 is arranged in such a manner that the light can be taken-in from the outer surface side of the upper casing 71.

Hereupon, this image pickup apparatus may also be arranged above or on the side surface of the display image screen D2 in the upper casing 71. Further, it is of cause that the mobile phone is not limited to a folding type.

Figure 4:
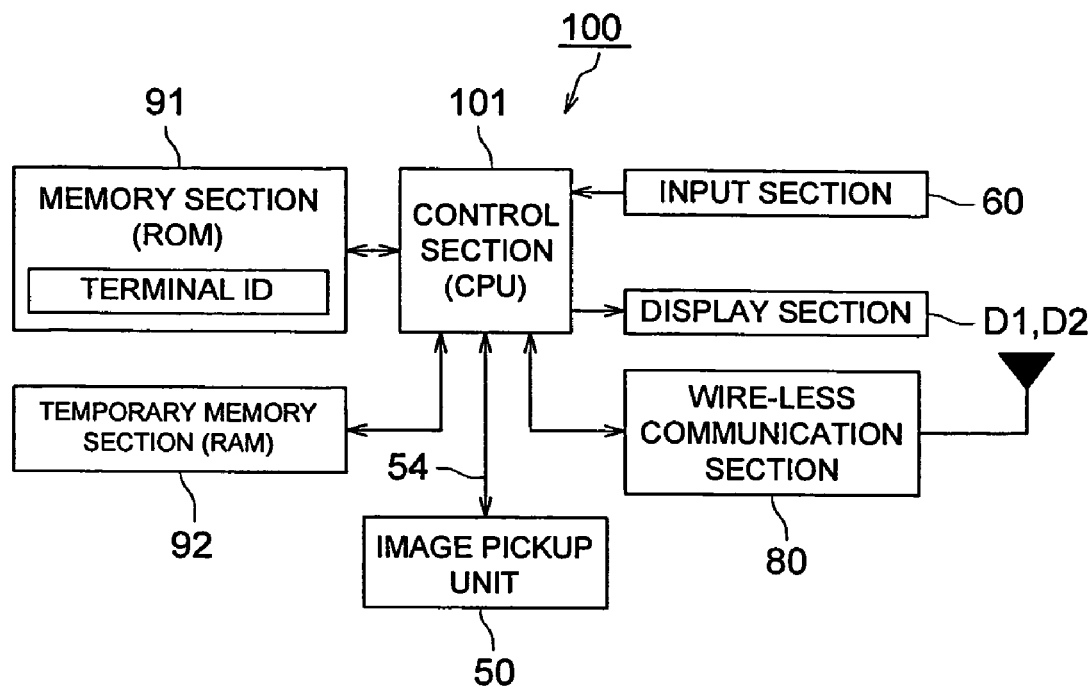
FIG. 4 is a control block diagram of the mobile phone.

FIG. 4 is a block diagram of the mobile phone 100.

As shown in the view, the external connecting terminal 54 (shown by an arrow) of the image pickup apparatus 50 is connected to the control section 101 of the mobile phone 100, and the image signal such as the brightness signal or the color difference signal is outputted to the control section 101.

On the one hand, the mobile phone 100 is provided with: a control section (CPU) 101 which generally controls each section and executes the program corresponding to each processing, operation buttons 60 which is an input section for indicating-inputting the number, the display image screens D1 and D2 for displaying the predetermined data display or image picked-up image, a wireless communication section 80 for realizing an each kind of information communication to the external server, a memory section (ROM) 91 which stores the data necessary for the system program of the mobile phone 100 or each kind of processing program or terminal ID, and a temporary memory section (RAM) 92 which temporarily stores each kind of processing program or data or processing data processed by the control section 101, the image data by the image pickup apparatus 50, or is used as a working area.

Further, the image signal inputted from the image pickup apparatus 50 is stored in the memory section 91 by the control section 101 of the mobile phone 100, is displayed on the display image planes D1 and D2, and further is transmitted to the outside as the image information through the wireless communication section 80.

EXAMPLES

An Example of the image pickup lens applied to the above embodiment will be shown below. Symbols used in each example are as follows:

f is a focal length of the total system of the image pickup lens,

FB is a back focus,

F is a F number, 2Y is a diagonal line length of an image pickup surface of the solid state image pickup element, R is a curvature radius, D is a interval between surfaces along the axis, Nd is a refractive index of the lens material for d-line, and vd is Abbe's number of the lens material.

In each Example, the shape of the aspheric surface is expressed by the following (Math-1) in which the top of the surface is on the origin, x-axis extends along the optical axis direction, and the height perpendicular to the optical axis is h.

$$X = \frac{h^2/R}{1+\sqrt{1-(1+K)h^2/R^2}} + \sum A_i h^i \qquad \text{(Math-1)}$$

Where, $A_i$ is i-th order of aspheric surface coefficient,

R is a curvature radius,

K is a conical coefficient.

Further, exponent of 10 (for example, $2.5 \times 10^{-02}$) is expressed by using E (for example, 2.5E-02) below (including the lens data in tables). Further, the surface number of the lens data is affixed in the order in such a manner that the object side of the first lens is made the first surface.

Example 1

The lens data of the image pickup lens of Example 1 will be shown in Tables 1 and 2.

TABLE 1

| Surface No. | R (mm) | D (mm) | Nd | vd |
|---|---|---|---|---|
| stop | ∞ | 0.10 | | |
| 1 | 3.400 | 0.95 | 1.58913 | 61.2 |
| 2 | −48.443 | 0.65 | | |
| 3 | −16.476 | 0.60 | 1.58300 | 30.0 |
| 4 | 2.973 | 0.31 | | |
| 5 | 13.849 | 1.75 | 1.53180 | 56.0 |
| 6 | −1.340 | 0.10 | | |
| 7 | 2.491 | 0.75 | 1.58300 | 30.0 |
| 8 | 1.012 | 1.00 | | |
| 9 | ∞ | 0.50 | 1.51633 | 64.1 |
| 10 | ∞ | | | | f = 4.67  fB = 0.61  F = 3.6  2Y = 5.64

TABLE 2

| Aspheric surface coefficient | |
|---|---|
| The 1st surface | K = 5.60270E+00 |
| | A4 = −2.20160E−02 |
| | A6 = 1.28810E−02 |
| | A8 = −1.72400E−02 |
| The 2nd surface | K = 5.00000E+01 |
| | A4 = −6.33640E−03 |
| | A6 = 1.52780E−02 |
| The 3rd surface | K = 5.00000E+01 |
| | A4 = −7.02970E−02 |
| | A6 = 2.30180E−02 |
| | A8 = −1.65480E−03 |
| The 4-th surface | K = −1.78460E+01 |
| The 5-th surface | K = 3.72270E+01 |
| The 6-th surface | K = −3.76630E+00 |
| | A4 = −5.41180E−02 |
| | A6 = 1.53370E−02 |
| | A8 = −3.48020E−03 |
| | A10 = 5.21670E−04 |
| | A12 = 2.38610E−06 |
| The 7-th surface | K = −1.76110E+00 |
| | A4 = −8.36330E−02 |
| | A6 = 1.65050E−02 |
| | A8 = −1.74090E−03 |
| | A10 = 8.94160E−05 |
| | A12 = −1.22700E−06 |

TABLE 2-continued

| Aspheric surface coefficient | |
|---|---|
| The 8-th surface | K = −3.67220E+00 |
| | A4 = −4.67830E−02 |
| | A6 = 8.80830E−02 |
| | A8 = −1.13500E−03 |
| | A10 = 7.93400E−05 |
| | A12 = −2.44830E−06 |

Figure 5:
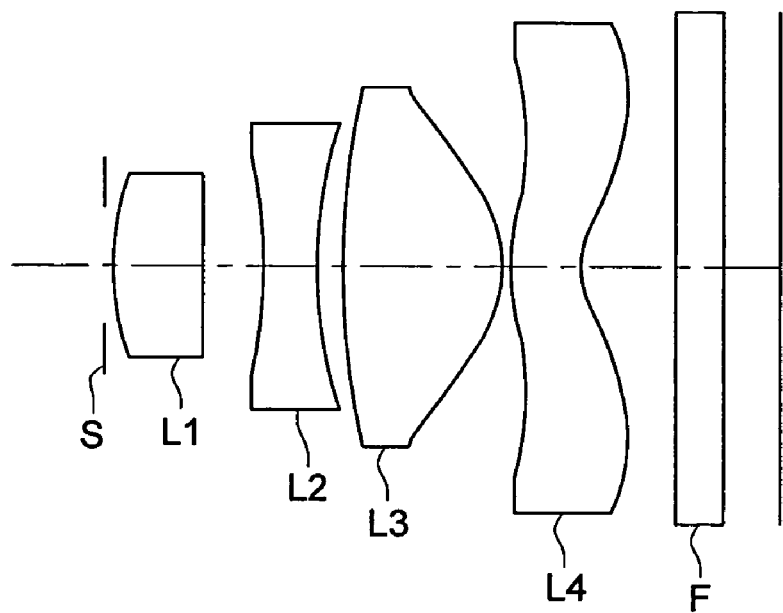
FIG. 5 is a sectional view of the image pickup lens shown in Example 1.

FIG. 5 is a sectional view of the image pickup lens shown in Example 1. In the view, S is an aperture stop, L1 is the first lens, L2 is the second lens, L3 is the third lens, and L4 is the fourth lens. Further, F is a parallel plate assuming elements including an optical low-pass filter, IR cut filter or seal glass of the solid-state image pickup element.

Figure 6:
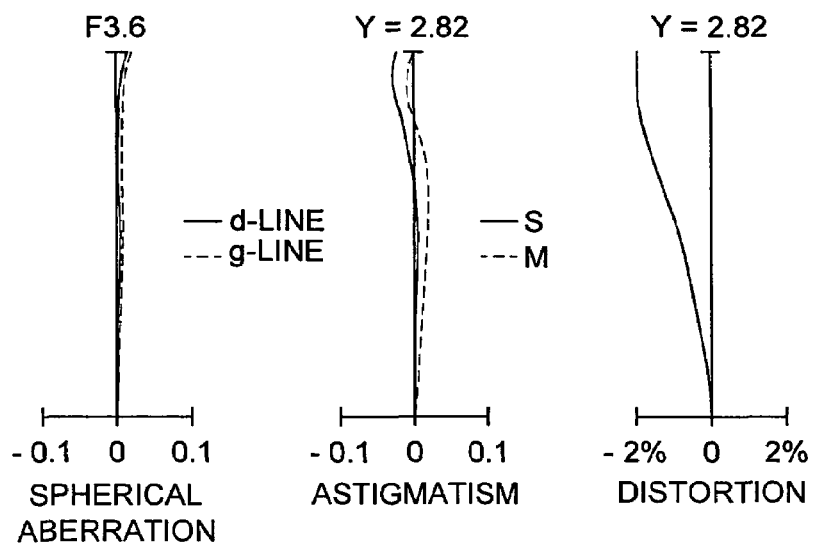
FIG. 6 is aberration views (spherical aberration, astigmatism, distortion, meridional coma) of the image pickup lens shown in Example 1.
Figure 6:
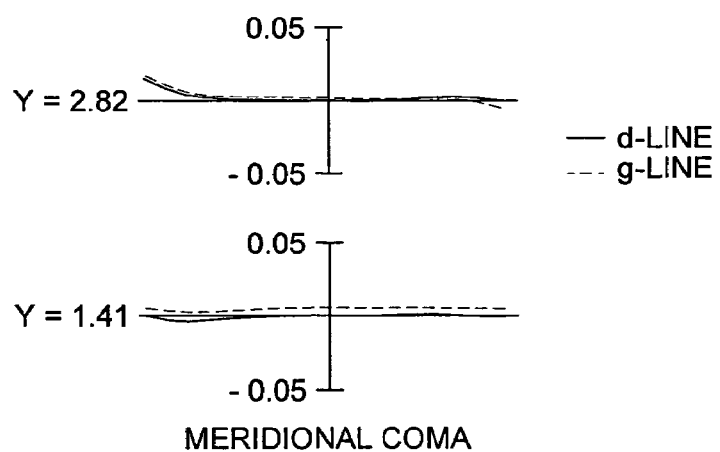

FIG. 6 is the aberration view (spherical aberration, Astigmatism, distortion, meridional coma) of the image pickup lens shown in Example 1.

The first lens is a glass lens and the second and the fourth lens are formed of plastic lens of the polycarbonate system, whose saturation water absorption coefficient is 0.4%. The third lens is formed of the plastic lens of polyolefin system whose saturation water absorption coefficient is less than 0.01%.

For the image pickup element, 1/3.2 of inch type, pixel pitch of 2.2 μm, 2048×1536 of pixels are assumed.

Hereupon, the change of refractive index nd by the temperature of the plastic material will be shown in Table 3.

TABLE 3

| | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 1, the image point position variation (which is back focus changing amount ($\Delta fB$)) when the temperature is raised by +30 (° C.) to the normal temperature 20 (° C.) is −0.0004 mm.

Hereupon, the back focus changing amount ($\Delta fB$) at the time of temperature rise is obtained according to the refractive index changing amount of the plastic lens shown in Table 3. This is the image point position variation at the time of temperature change is due to the refractive index change of the plastic lens, and the influence of the thermal expansion of the plastic lens at the time of temperature rise or the influence of the thermal expansion of the lens barrel holding the lens are not considered.

Further, the focal depth is generally expressed by the following expression.

The focal depth=±F number×2×pixel pitch

The focal depth on the image pickup element side assumed in Example 1 is ±0.0158 mm, and the image point position variation of the image pickup lens shown in Example 1 can be suppressed very small to this focal depth. It is preferable that the image point position variation is less than the focal depth at the most, and desirably, it is suppressed smaller than a half of it. In contrast to this, the image point position variation amount to the focal depth amount can be made to a small value of about 2.5% in the image pickup lens in Example 1, and there is entirely no problem.

Example 2

The lens data of the image pickup lens of Example 2 will be shown in Tables 4 and 5.

TABLE 4 f = 4.64  fB = 0.66  F = 3.2  2Y = 5.64

| Surface No. | R (mm) | D (mm) | Nd | vd |
|---|---|---|---|---|
| stop | ∞ | 0.10 | | |
| 1 | 3.521 | 0.73 | 1.58913 | 61.2 |
| 2 | −32.328 | 0.73 | | |
| 3 | −10.204 | 0.68 | 1.58300 | 30.0 |
| 4 | 3.166 | 0.27 | | |
| 5 | 10.407 | 1.81 | 1.53180 | 56.0 |
| 6 | −1.263 | 0.10 | | |
| 7 | 2.854 | 0.75 | 1.58300 | 30.0 |
| 8 | 1.022 | 1.00 | | |
| 9 | ∞ | 0.50 | 1.51633 | 64.1 |
| 10 | ∞ | | | |

TABLE 5

| Aspheric surface coefficient | |
|---|---|
| The 1st surface | K = 6.04800E+00 |
| | A4 = −2.32020E−02 |
| | A6 = 1.51830E−02 |
| | A8 = −1.49850E−02 |
| The 2nd surface | K = 5.00000E+01 |
| | A4 = −6.95140E−03 |
| | A6 = 1.81380E−02 |
| The 3rd surface | K = 5.00000E+01 |
| | A4 = −5.41240E−02 |
| | A6 = 1.90030E−02 |
| | A8 = 4.16150E−03 |
| The 4-th surface | K = −1.65610E+01 |
| The 5-th surface | K = 2.00250E+01 |
| The 6-th surface | K = −3.51430E+00 |
| | A4 = −5.39210E−02 |
| | A6 = 1.72540E−02 |
| | A8 = −3.85680E−03 |
| | A10 = 5.78810E−04 |
| | A12 = −8.77630E−06 |
| The 7-th surface | K = −2.13310E+00 |
| | A4 = −8.27820E−02 |
| | A6 = 1.89210E−02 |
| | A8 = −2.19640E−03 |
| | A10 = 6.81210E−05 |
| | A12 = 4.40220E−06 |
| The 8-th surface | K = −3.90040E+00 |
| | A4 = −4.88900E−02 |
| | A6 = 9.99010E−03 |
| | A8 = −1.28330E−03 |
| | A10 = 7.73850E−05 |
| | A12 = −1.73380E−06 |

Figure 7:
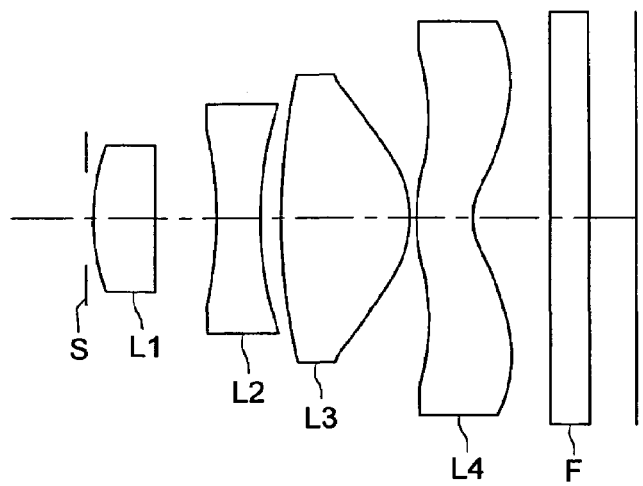
FIG. 7 is a sectional view of the image pickup lens shown in Example 2.

FIG. 7 is a sectional view of the image pickup lens shown in Example 2. In the view, S is aperture stop, L1 is the first lens, L2 is the second lens, L3 is the third lens, and L4 is the fourth lens. Further, F is a parallel plate assuming elements including an optical low-pass filter, IR cut filter, and a seal glass of the solid-state image pickup element.

Figure 8:
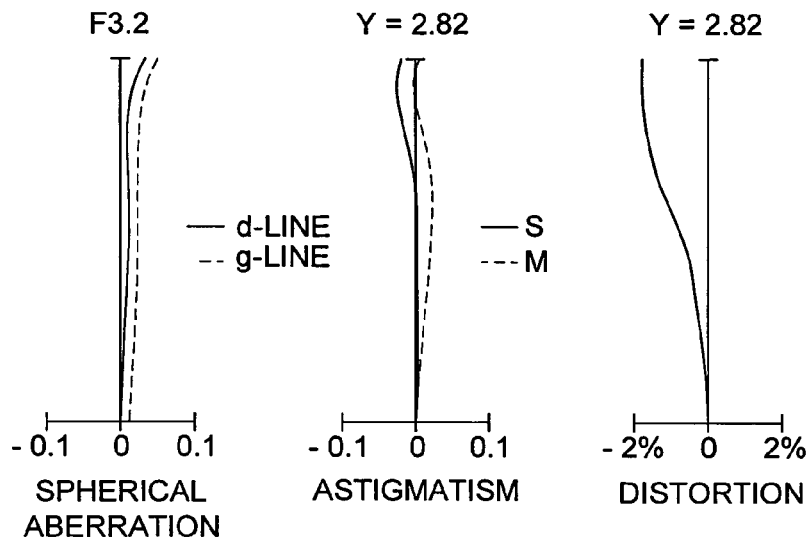
FIG. 8 is aberration views (spherical aberration, astigmatism, distortion, meridional coma) of the image pickup lens shown in Example 2.
Figure 8:
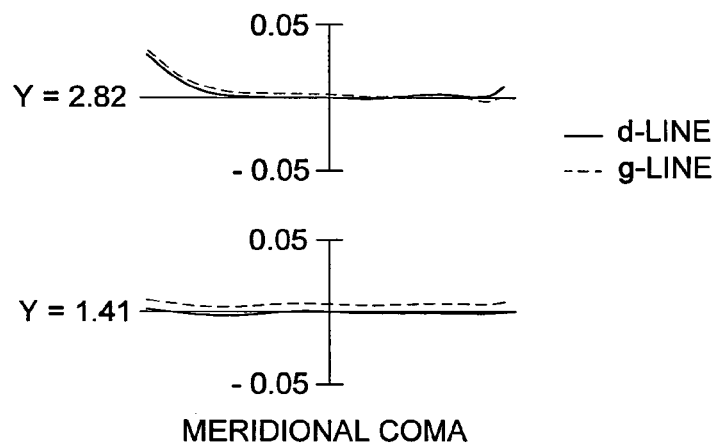

FIG. 8 is the aberration view (spherical aberration, astigmatism, distortion, meridional coma) of the image pickup lens shown in Example 2.

The first lens is a glass lens and the second and the fourth lens are formed of plastic lens of the polycarbonate system, whose saturation water absorption coefficient is 0.4%. The third lens is formed of the plastic lens of polyolefin system whose saturation water absorption coefficient is less than 0.01%.

For the image pickup element, 1/3.2 of inch type, pixel pitch of 2.2 μm, 2048×1536 of pixels are assumed.

Hereupon, the change of refractive index nd by the temperature of the plastic material will be shown in Table 6.

TABLE 6

|  | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 2, the image point position variation (which is back focus changing amount (ΔfB)) when the temperature is raised by +30 (° C.) to the normal temperature 20 (° C.) is −0.0005 mm.

The focal depth on the image pickup element side assumed in Example 2 is ±0.0141 mm, and in contrast to this, the image point position variation amount to the focal depth amount in can be made to a small value of about 3.5% in the image pickup lens in Example 2, and there is entirely no problem.

Example 3

The lens data of the image pickup lens of Example 3 will be shown in Tables 7 and 8.

TABLE 7 f = 4.67  fB = 0.60  F = 3.6  2Y = 5.64

| Surface No. | R (mm) | D (mm) | Nd | νd |
|---|---|---|---|---|
| stop | ∞ | 0.10 | | |
| 1 | 2.448 | 0.71 | 1.69350 | 53.2 |
| 2 | 12.600 | 0.30 | | |
| 3 | −32.118 | 0.60 | 1.58300 | 30.0 |
| 4 | 2.641 | 0.27 | | |
| 5 | 9.147 | 1.08 | 1.53180 | 56.0 |
| 6 | −2.862 | 0.67 | | |
| 7 | 2.253 | 0.75 | 1.58300 | 30.0 |
| 8 | 1.437 | 0.60 | | |
| 9 | ∞ | 0.50 | 1.51633 | 64.1 |
| 10 | ∞ | | | |

TABLE 8

| Aspheric surface coefficient | |
|---|---|
| The 1st surface | K = 2.83420E+00<br>A4 = −2.23320E−02<br>A6 = 8.37210E−03<br>A8 = −1.65920E−02 |
| The 2nd surface | K = −9.55700E+00<br>A4 = −1.09110E−02<br>A6 = 1.43570E−02 |
| The 3rd surface | K = −5.00000E+01<br>A4 = −1.01360E−01<br>A6 = 3.65930E−02<br>A8 = −5.94560E−03 |
| The 4-th surface | K = −1.26420E+01 |
| The 5-th surface | K = 2.69760E+01 |
| The 6-th surface | K = −1.63500E+00<br>A4 = −3.47540E−02<br>A6 = 2.10900E−02<br>A8 = −3.97440E−03<br>A10 = 6.02160E−04<br>A12 = 1.92000E−04 |

TABLE 8-continued

| Aspheric surface coefficient | |
|---|---|
| The 7-th surface | K = −7.19830E+00<br>A4 = −9.55950E−02<br>A6 = 1.95040E−02<br>A8 = −2.00380E−03<br>A10 = −6.34290E−05<br>A12 = 3.33310E−05 |
| The 8-th surface | K = −4.95650E+00<br>A4 = −5.49690E−02<br>A6 = 1.00790E−02<br>A8 = −1.40120E−03<br>A10 = 1.03120E−04<br>A12 = −3.28560E−06 |

Figure 9:
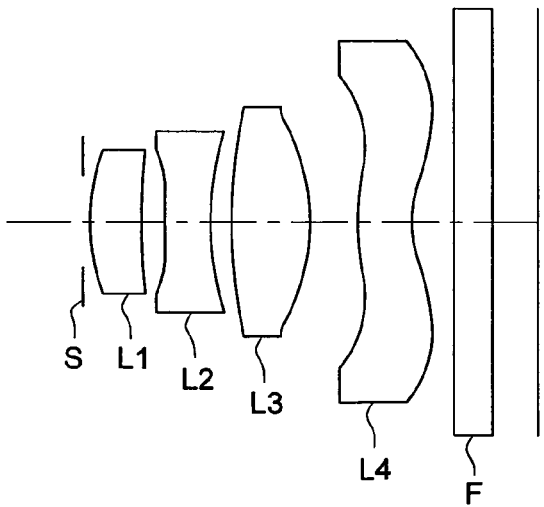
FIG. 9 is a sectional view of the image pickup lens shown in Example 3.

FIG. 9 is a sectional view of the image pickup lens shown in Example 3. In the view, S is aperture stop, L1 is the first lens, L2 is the second lens, L3 is the third lens, and L4 is the fourth lens. Further, F is a parallel plate assuming elements including an optical low-pass filter, IR cut filter, and a seal glass of the solid-state image pickup element.

Figure 10:
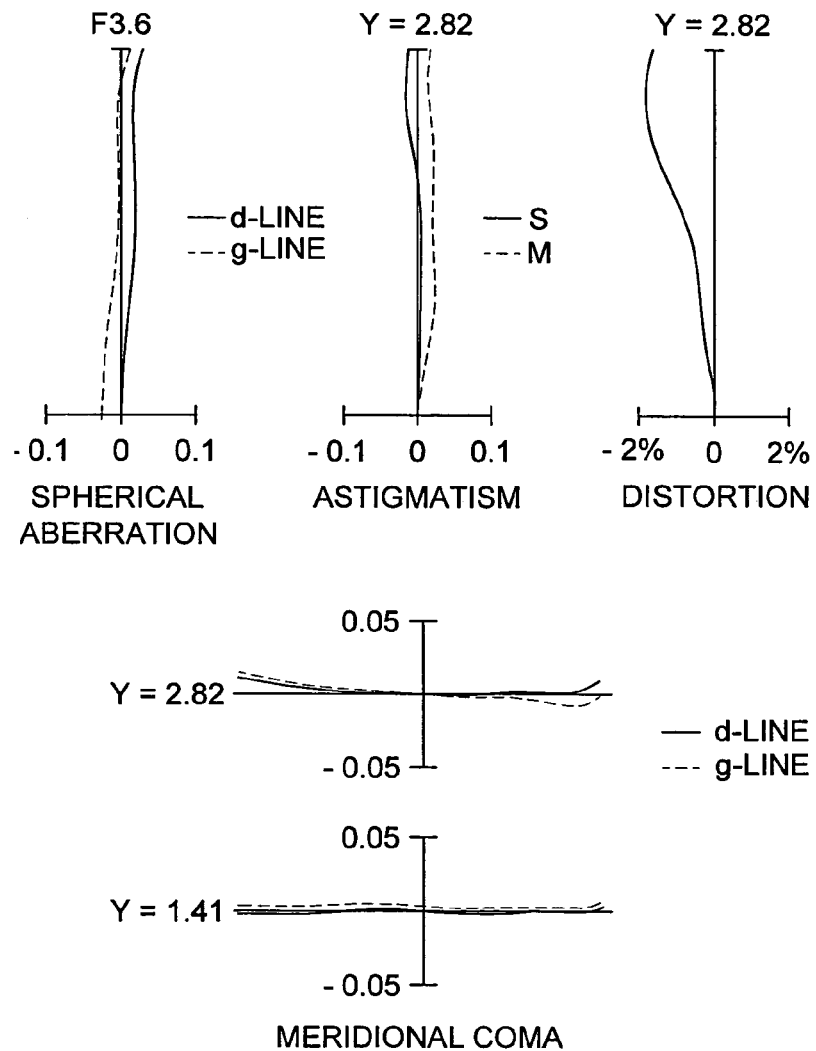
FIG. 10 is aberration views (spherical aberration, astigmatism, distortion, meridional coma) of the image pickup lens shown in Example 3.

FIG. 10 is the aberration view (spherical aberration, astigmatism, distortion, meridional coma) of the image pickup lens shown in Example 3.

The first lens is a glass lens and the second and the fourth lens are formed of plastic lens of the polycarbonate system, whose saturation water absorption coefficient is 0.4%. The third lens is formed of the plastic lens of polyolefin system whose saturation water absorption coefficient is less than 0.01%.

For the image pickup element, 1/3.2 of inch type, pixel pitch of 2.2 μm, 2048×1536 of pixels are assumed.

Hereupon, the change of refractive index nd by the temperature of the plastic material will be shown in Table 9.

TABLE 9

|  | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 3, the image point position variation (which is back focus changing amount (ΔfB)) when the temperature is raised by +30 (° C.) to the normal temperature 20 (° C.) is −0.0077 mm.

The focal depth on the image pickup element side assumed in Example 3 is ±0.0158 mm, and in contrast to this, the image point position variation amount to the focal depth amount in can be made to half or less of the focal depth in the image pickup lens in Example 3, and there is entirely no problem.

Example 4

The lens data of the image pickup lens of Example 4 will be shown in Tables 10 and 11.

TABLE 10 f = 4.75  fB = 0.66  F = 3.2  2Y = 5.76

| Surface No. | R (mm) | D (mm) | Nd | νd |
|---|---|---|---|---|
| stop | ∞ | 0.10 | | |
| 1 | 3.400 | 0.95 | 1.58913 | 61.2 |

TABLE 10-continued f = 4.75　fB = 0.66　F = 3.2　2Y = 5.76

| Surface No. | R (mm) | D (mm) | Nd | νd |
|---|---|---|---|---|
| 2 | −53.442 | 0.49 | | |
| 3 | 10.504 | 0.60 | 1.58300 | 30.0 |
| 4 | 2.607 | 0.36 | | |
| 5 | 15.046 | 1.41 | 1.53180 | 56.0 |
| 6 | −1.556 | 0.36 | | |
| 7 | 5.353 | 0.75 | 1.58300 | 30.0 |
| 8 | 1.348 | 0.60 | | |
| 9 | ∞ | 0.50 | 1.51633 | 64.1 |
| 10 | ∞ | | | |

TABLE 11

Aspheric surface coefficient

| | |
|---|---|
| The 1st surface | K = 5.43580E+00 |
| | A4 = −2.25980E−02 |
| | A6 = 7.05120E−03 |
| | A8 = −1.24230E−02 |
| The 2nd surface | K = −5.00000E+01 |
| | A4 = −4.24760E−03 |
| | A6 = 1.03310E−02 |
| The 3rd surface | K = 3.35490E+01 |
| | A4 = −5.99630E−02 |
| | A6 = 2.21550E−02 |
| | A8 = −1.37590E−03 |
| The 4-th surface | K = −1.05250E+01 |
| The 5-th surface | K = 5.00000E+01 |
| The 6-th surface | K = −4.34300E+00 |
| | A4 = −4.74240E−02 |
| | A6 = 1.50840E−02 |
| | A8 = −3.01540E−03 |
| | A10 = 4.10850E−04 |
| | A12 = 4.74790E−05 |
| The 7-th surface | K = −6.59730E−01 |
| | A4 = −8.47310E−02 |
| | A6 = 1.40860E−02 |
| | A8 = −1.22730E−03 |
| | A10 = 7.24940E−05 |
| | A12 = −2.04340E−05 |
| The 8-th surface | K = −4.92810E+00 |
| | A4 = −4.65160E−02 |
| | A6 = 8.39460E−03 |
| | A8 = −1.06750E−03 |
| | A10 = 6.74720E−05 |
| | A12 = −2.46510E−06 |

Figure 11:
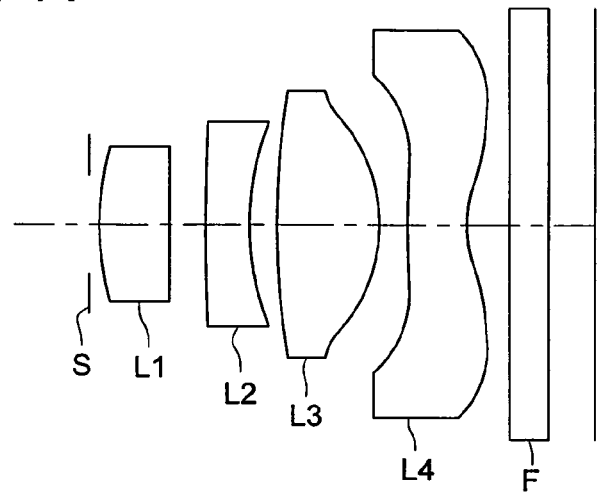
FIG. 11 is a sectional view of the image pickup lens shown in Example 4.

FIG. 11 is a sectional view of the image pickup lens shown in Example 4. In the view, S is aperture stop, L1 is the first lens, L2 is the second lens, L3 is the third lens, and L4 is the fourth lens. Further, F is a parallel plate assuming elements including an optical low-pass filter, IR cut filter, and a seal glass of the solid-state image pickup element.

Figure 12:
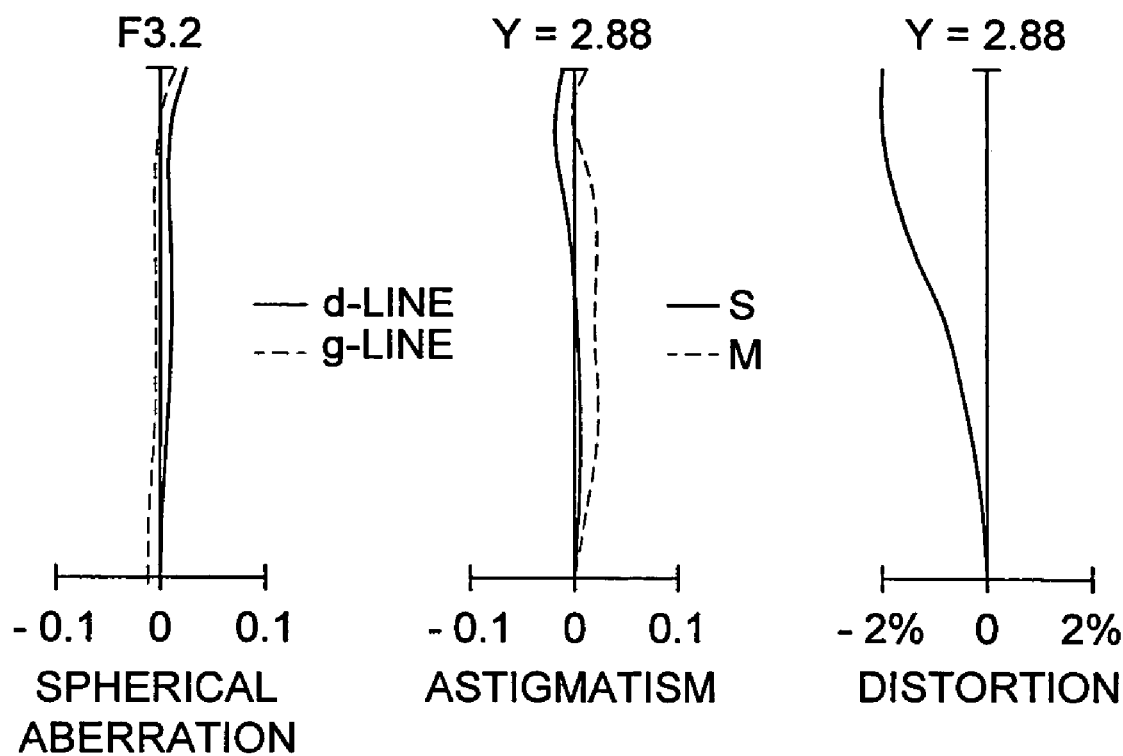
FIG. 12 is aberration views (spherical aberration, astigmatism, distortion, meridional coma) of the image pickup lens shown in Example 4.
Figure 12:
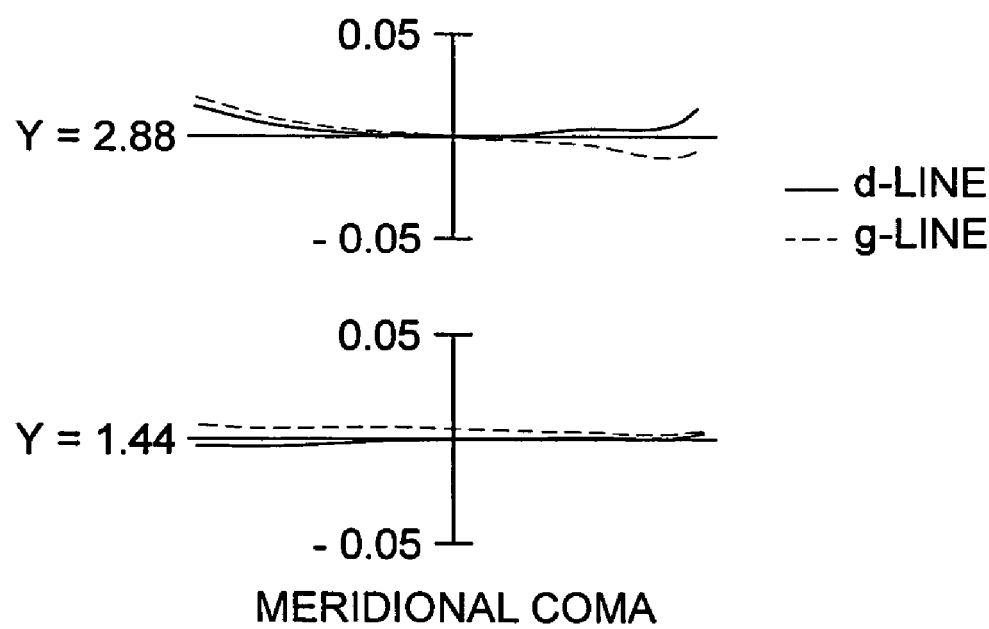

FIG. 12 is the aberration view (spherical aberration, astigmatism, distortion, meridional coma) of the image pickup lens shown in Example 4.

The first lens a glass lens, the second and the fourth lens are formed of the plastic material of polycarbonate system, whose saturation water absorption coefficient is 0.4%. The third lens is formed of the plastic material of polyolefin system whose saturation water absorption coefficient is less than 0.01%.

For the image pickup element, ⅓.2 inch type, pixel pitch 2.25 μm, 2048×1536 pixels are assumed.

Hereupon, the change of refractive index nd by the temperature of the plastic material will be shown in Table 12.

TABLE 12

| | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 4, the image point position variation (which is back focus changing amount ($\Delta fB$)) when the temperature is raised by +30 (° C.) to the normal temperature 20 (° C.) is −0.0012 mm.

The focal depth on the image pickup element side assumed in Example 4, is ±0.0144 mm, in contrast to this, in the image pickup lens in Example 4, the image point position variation amount to the focal depth amount can be made to a small value of about 8.3%, and there is entirely no problem.

Example 5

The lens data of the image pickup lens of Example 5 will be shown in Tables 13 and 14.

TABLE 13 f = 4.66　fB = 0.18　F = 3.2　2Y = 5.64

| Surface No. | R (mm) | D (mm) | Nd | νd |
|---|---|---|---|---|
| stop | ∞ | 0.10 | | |
| 1 | 3.096 | 0.74 | 1.58913 | 61.2 |
| 2 | 12.110 | 0.50 | | |
| 3 | 8.080 | 0.60 | 1.58300 | 30.0 |
| 4 | 2.507 | 0.31 | | |
| 5 | 8.432 | 1.81 | 1.53180 | 56.0 |
| 6 | −1.255 | 0.54 | | |
| 7 | −7.649 | 0.70 | 1.58300 | 30.0 |
| 8 | 1.780 | 1.00 | | |
| 9 | ∞ | 0.50 | 1.51633 | 64.1 |
| 10 | ∞ | | | |

TABLE 14

Aspheric surface coefficient

| | |
|---|---|
| The 1st surface | K = 5.13650E+00 |
| | A4 = −1.20670E−02 |
| | A6 = 9.37370E−03 |
| | A8 = −1.42210E−02 |
| The 2nd surface | K = 2.35600E+01 |
| | A4 = 2.00770E−02 |
| | A6 = 2.55150E−02 |
| The 3rd surface | K = 1.48590E+00 |
| | A4 = −5.27560E−02 |
| | A6 = 2.43460E−02 |
| | A8 = −1.06650E−03 |
| The 4th surface | K = −7.28730E+00 |
| The 5th surface | K = 1.46820E+01 |
| The 6th surface | K = −3.01910E+00 |
| | A4 = −4.64600E−02 |
| | A6 = 1.57680E−02 |
| | A8 = −3.91480E−03 |
| | A10 = 3.35160E−04 |
| | A12 = 5.97290E−05 |
| The 7th surface | K = −5.00000E+00 |
| | A4 = −3.61680E−02 |
| | A6 = 9.41060E−03 |
| | A8 = −2.24970E−03 |
| | A10 = 1.64960E−04 |
| | A12 = 7.88250E−06 |

TABLE 14-continued

| Aspheric surface coefficient | |
|---|---|
| The 8th surface | K = −8.43690E+00 |
| | A4 = −2.58400E−02 |
| | A6 = 5.35470E−03 |
| | A8 = −8.39270E−04 |
| | A10 = 5.59830E−05 |
| | A12 = −8.79580E−07 |

Figure 13:
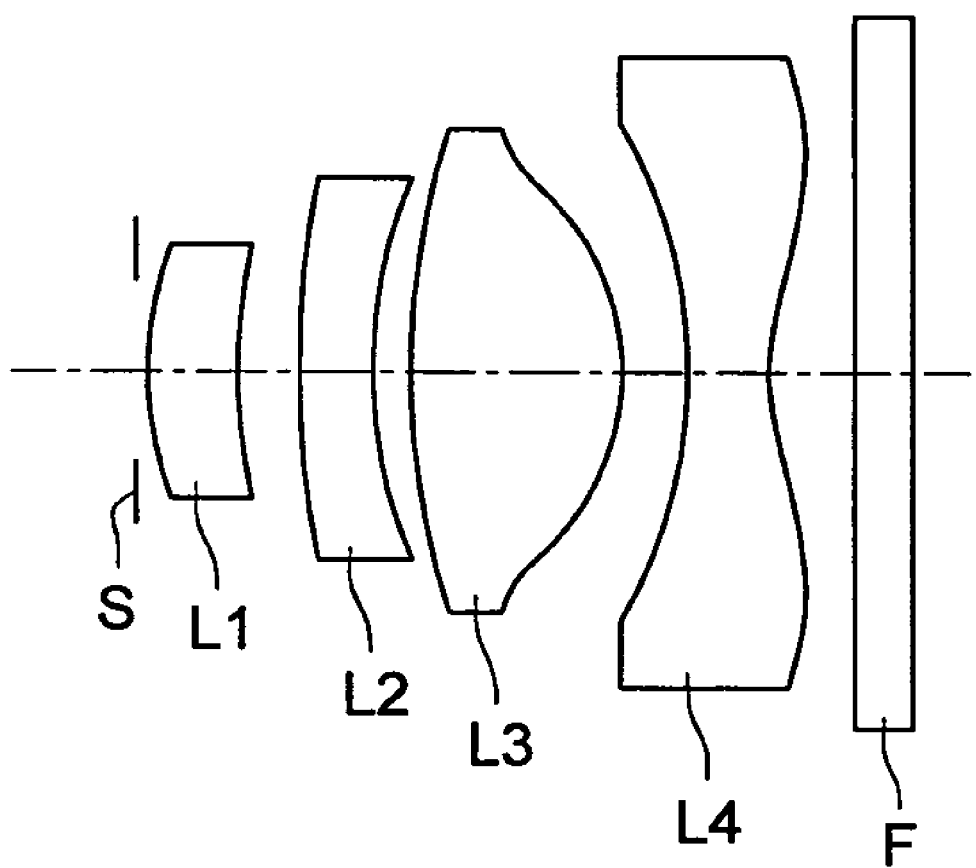
FIG. 13 is a sectional view of the image pickup lens shown in Example 5.

FIG. 13 is a sectional view of the image pickup lens shown in Example 5. In the view, S is aperture stop, L1 is the first lens, L2 is the second lens, L3 is the third lens, and L4 is the fourth lens. Further, F is a parallel plate assuming elements including an optical low-pass filter, IR cut filter, and a seal glass of the solid-state image pickup element.

Figure 14:
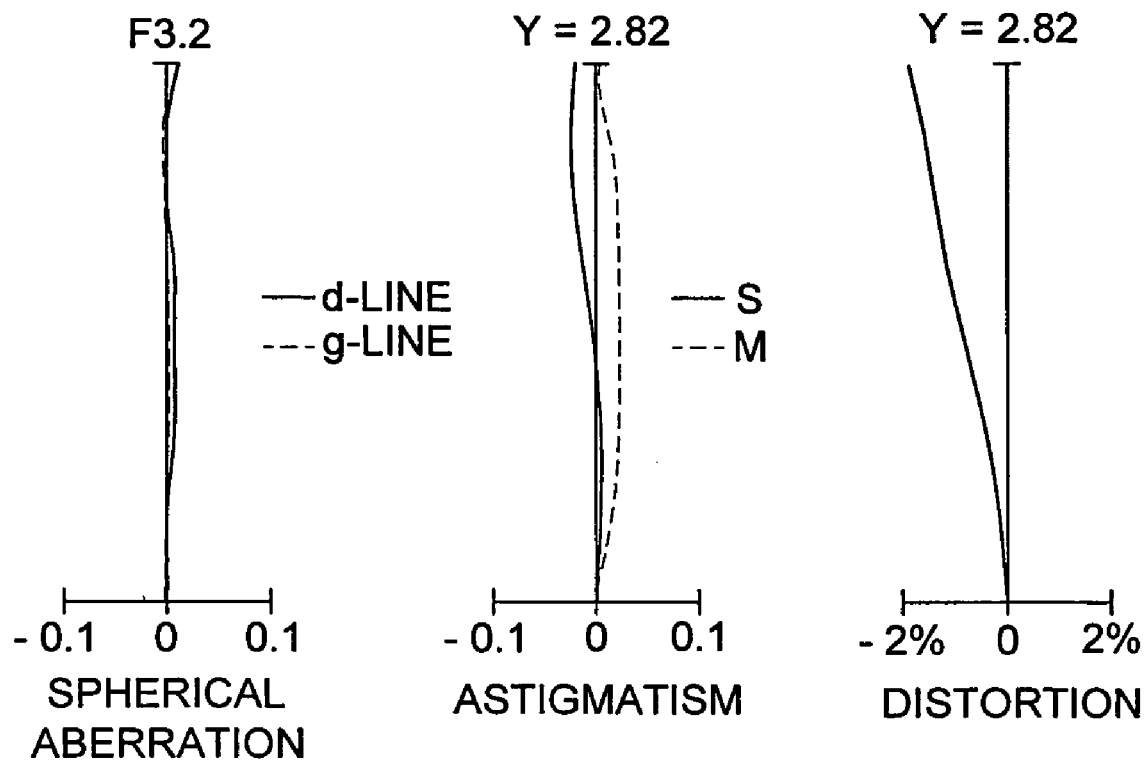
FIG. 14 is aberration views (spherical aberration, astigmatism, distortion, meridional coma) of the image pickup lens shown in Example 5.
Figure 14:
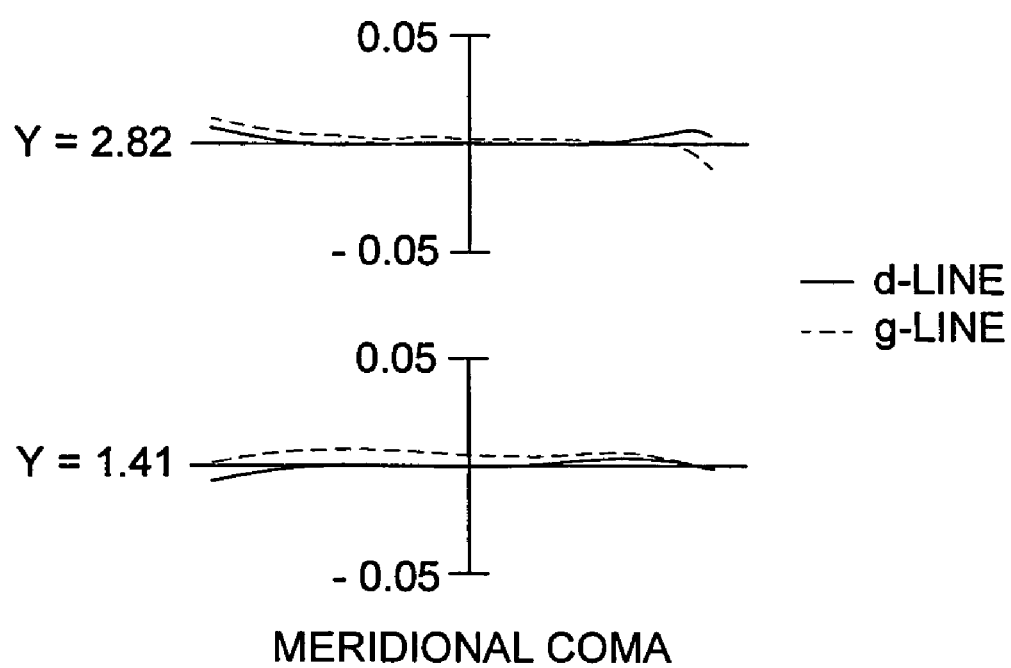

FIG. 14 is the aberration view (spherical aberration, astigmatism, distortion, meridional coma) of the image pickup lens shown in Example 5.

The first lens is a glass lens and the second and the fourth lens are formed of plastic lens of the polycarbonate system, whose saturation water absorption coefficient is 0.4%. The third lens is formed of the plastic lens of polyolefin system whose saturation water absorption coefficient is less than 0.01%.

For the image pickup element, 1/3.2 of inch type, pixel pitch of 2.2 μm, 2048×1536 of pixels are assumed.

Hereupon, the change of refractive index nd by the temperature of the plastic material will be shown in Table 15.

TABLE 15

| | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 5, the image point position variation (which is back focus changing amount (ΔfB)) when the temperature is raised by +30 (° C.) to the normal temperature 20 (° C.) is −0.0047 mm.

The focal depth on the image pickup element side assumed in Example 5 is ±0.0141 mm, and in contrast to this, the image point position variation amount to the focal depth amount in can be made to half or less of the focal depth in the image pickup lens in Example 5, and there is entirely no problem.

Example 6

The lens data of the image pickup lens of Example 6 will be shown in Tables 16 and 17.

TABLE 16

| f = 4.62  fB = 0.19  F = 3.2  2Y = 5.64 | | | | |
|---|---|---|---|---|
| Surface No. | R (mm) | D (mm) | Nd | νd |
| stop | ∞ | 0.10 | | |
| 1 | 2.149 | 0.78 | 1.58913 | 61.2 |
| 2 | 7.609 | 0.65 | | |
| 3 | −5.729 | 0.60 | 1.58300 | 30.0 |
| 4 | 4.687 | 0.26 | | |

TABLE 16-continued

| f = 4.62  fB = 0.19  F = 3.2  2Y = 5.64 | | | | |
|---|---|---|---|---|
| Surface No. | R (mm) | D (mm) | Nd | νd |
| 5 | 15.498 | 2.10 | 1.53180 | 56.0 |
| 6 | −0.808 | 0.10 | | |
| 7 | −108.526 | 0.70 | 1.58300 | 30.0 |
| 8 | 0.846 | 1.00 | | |
| 9 | ∞ | 0.50 | 1.51633 | 64.1 |
| 10 | ∞ | | | |

TABLE 17

| Aspheric surface coefficient | |
|---|---|
| The 1st surface | K = 1.95690E+00 |
| | A4 = −1.53450E−02 |
| | A6 = 2.81330E−03 |
| | A8 = −1.01050E−02 |
| The 2nd surface | K = 4.55330E+01 |
| | A4 = −1.04440E−03 |
| | A6 = 4.02400E−03 |
| The 3rd surface | K = 1.29360E+00 |
| | A4 = −7.07970E−02 |
| | A6 = 4.58790E−03 |
| | A8 = −6.35050E−03 |
| The 4th surface | K = −2.18250E+01 |
| The 5th surface | K = 5.00000E+01 |
| The 6th surface | K = −3.20380E+00 |
| | A4 = −5.76120E−02 |
| | A6 = 1.93100E−02 |
| | A8 = −4.14600E−03 |
| | A10 = 3.00810E−04 |
| | A12 = 2.72750E−05 |
| The 7th surface | K = −5.00000E+01 |
| | A4 = −1.84140E−02 |
| | A6 = 8.19390E−03 |
| | A8 = −1.78580E−03 |
| | A10 = 1.63820E−04 |
| | A12 = −4.90070E−06 |
| The 8th surface | K = −6.24080E+00 |
| | A4 = −2.86680E−02 |
| | A6 = 7.73500E−03 |
| | A8 = −1.15990E−03 |
| | A10 = 6.73650E−05 |
| | A12 = −1.08560E−06 |

Figure 15:
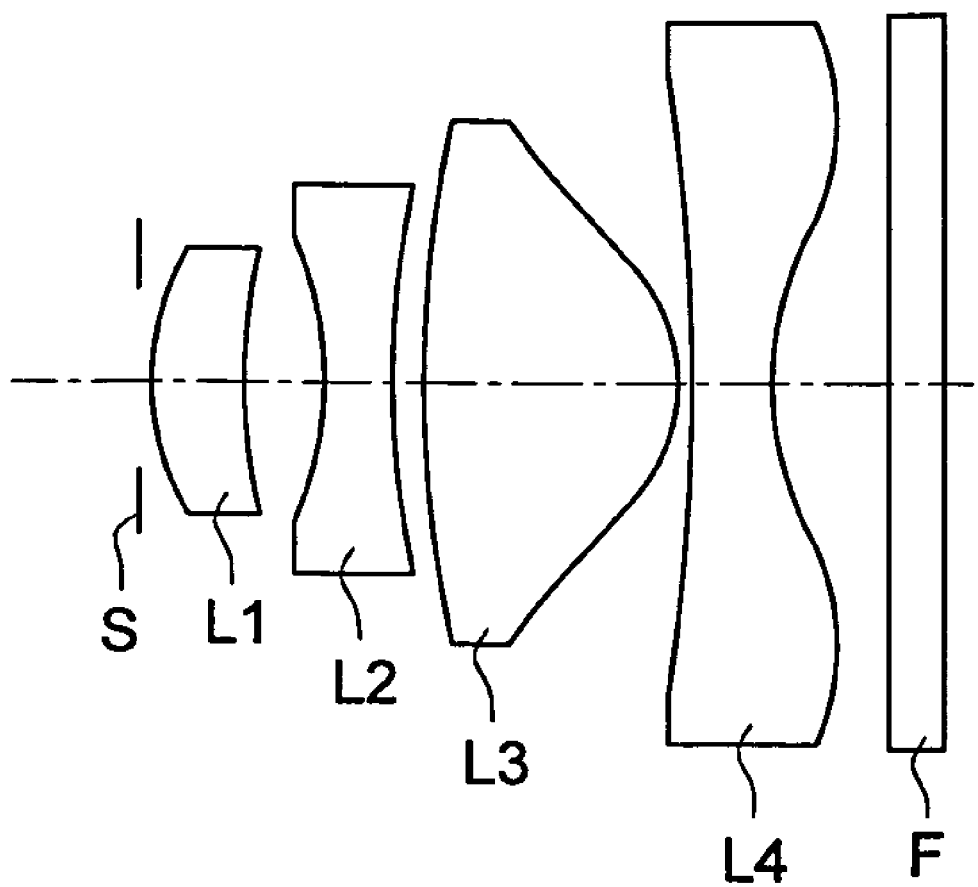
FIG. 15 is a sectional view of the image pickup lens shown in Example 6.

FIG. 15 is a sectional view of the image pickup lens shown in Example 6. In the view, S is aperture stop, L1 is the first lens, L2 is the second lens, L3 is the third lens, and L4 is the fourth lens. Further, F is a parallel plate assuming elements including an optical low-pass filter, IR cut filter, and a seal glass of the solid-state image pickup element.

Figure 16:
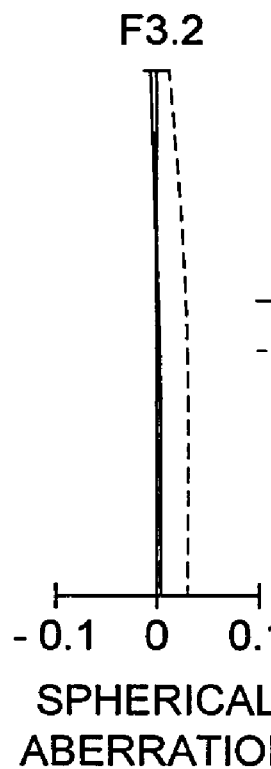
FIG. 16 is aberration views (spherical aberration, astigmatism, distortion, meridional coma) of the image pickup lens shown in Example 6.
Figure 16:
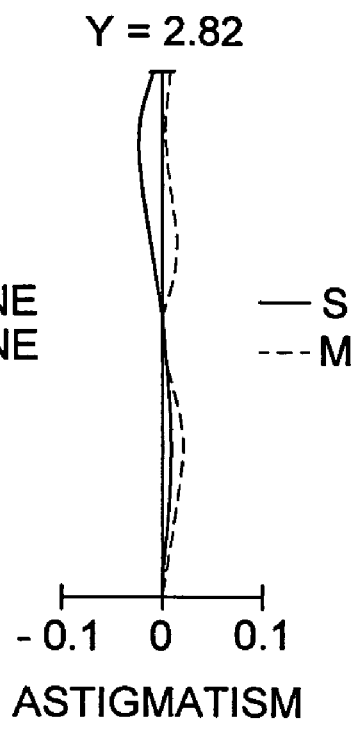
Figure 16:
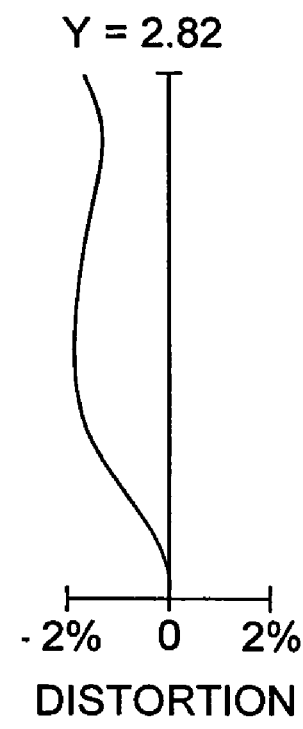
Figure 16:
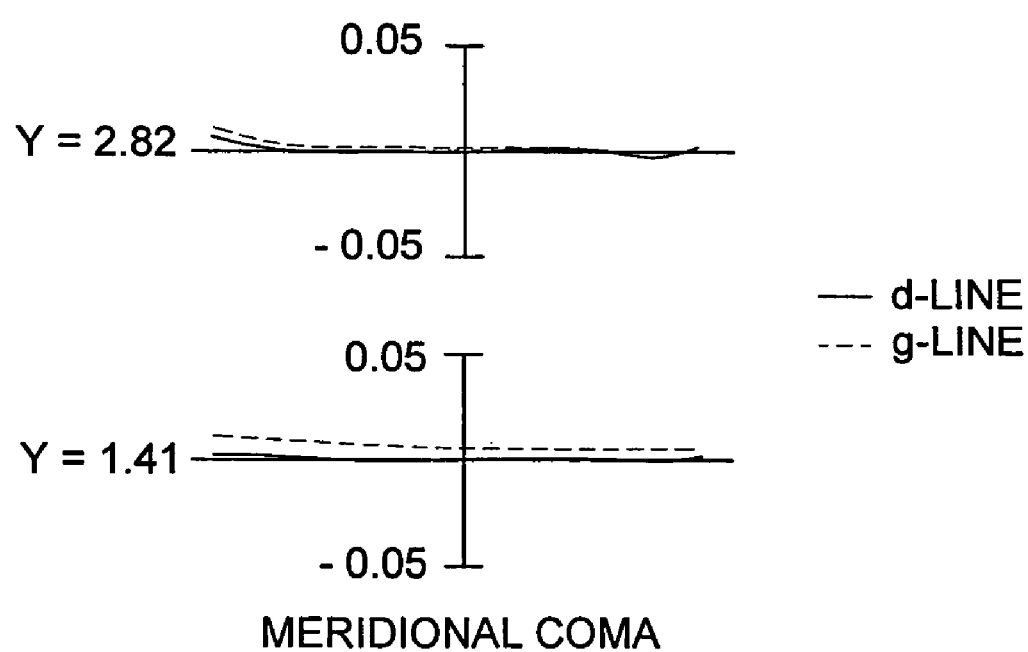

FIG. 16 is the aberration view (spherical aberration, astigmatism, distortion, meridional coma) of the image pickup lens shown in Example 6.

The first lens is a glass lens and the second and the fourth lens are formed of plastic lens of the polycarbonate system, whose saturation water absorption coefficient is 0.4%. The third lens is formed of the plastic lens of polyolefin system whose saturation water absorption coefficient is less than 0.01%.

For the image pickup element, 1/3.2 of inch type, pixel pitch of 2.2 μm, 2048×1536 of pixels are assumed.

Hereupon, the change of refractive index nd by the temperature of the plastic material will be shown in Table 18.

TABLE 18

| | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 6, the image point position variation (which is back focus changing amount ($\Delta fB$)) when the temperature is raised by +30 (° C.) to the normal temperature 20 (° C.) is −0.0042 mm.

The focal depth on the image pickup element side assumed in Example 6 is ±0.0141 mm, and in contrast to this, the image point position variation amount to the focal depth amount in can be made to half or less of the focal depth in the image pickup lens in Example 6, and there is entirely no problem.

Example 7

The lens data of the image pickup lens of Example 7 will be shown in Tables 19 and 20.

TABLE 19 f = 4.72  fB = 0.20  F = 3.6  2Y = 5.64

| Surface No. | R (mm) | D (mm) | Nd | νd |
|---|---|---|---|---|
| stop | ∞ | 0.10 | | |
| 1 | 2.752 | 0.71 | 1.69350 | 53.2 |
| 2 | 22.735 | 0.35 | | |
| 3 | −11.479 | 0.60 | 1.58300 | 30.0 |
| 4 | 2.824 | 0.27 | | |
| 5 | 9.304 | 1.31 | 1.53180 | 56.0 |
| 6 | −2.623 | 0.74 | | |
| 7 | 2.323 | 0.93 | 1.58300 | 30.0 |
| 8 | 1.474 | 1.00 | | |
| 9 | ∞ | 0.50 | 1.51633 | 64.1 |
| 10 | ∞ | | | |

TABLE 20

Aspheric surface coefficient

| | |
|---|---|
| The 1st surface | K = 3.38160E+00<br>A4 = −1.44580E−02<br>A6 = −1.07630E−03<br>A8 = −5.19090E−03 |
| The 2nd surface | K = 5.00000E+01<br>A4 = −6.92580E−03<br>A6 = 3.40870E−03 |
| The 3rd surface | K = −2.66900E+01<br>A4 = −9.25110E−02<br>A6 = 2.20940E−02<br>A8 = −8.60290E−03 |
| The 4th surface | K = −1.15250E+01 |
| The 5th surface | K = 2.42250E+01 |
| The 6th surface | K = −8.37460E−01<br>A4 = −3.86410E−02<br>A6 = 1.95750E−02<br>A8 = −4.42890E−03<br>A10 = 4.68560E−04<br>A12 = 8.35220E−05 |
| The 7th surface | K = −3.49680E+00<br>A4 = −8.98690E−02<br>A6 = 2.03300E−02<br>A8 = −1.99850E−03<br>A10 = −8.82330E−05<br>A12 = 2.36980E−05 |

TABLE 20-continued

Aspheric surface coefficient

| | |
|---|---|
| The 8th surface | K = −3.62660E+00<br>A4 = −4.85290E−02<br>A6 = 1.04750E−02<br>A8 = −1.44750E−03<br>A10 = 9.97540E−05<br>A12 = −2.60100E−06 |

Figure 17:
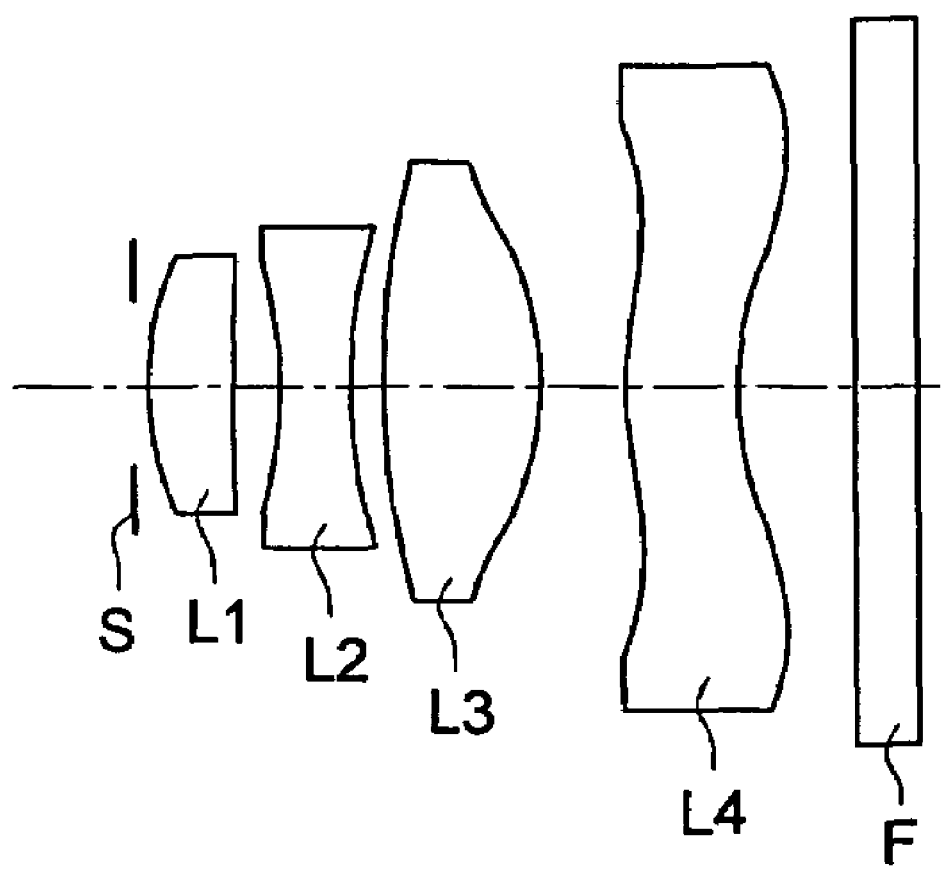
FIG. 17 is a sectional view of the image pickup lens shown in Example 7.

FIG. 17 is a sectional view of the image pickup lens shown in Example 7. In the view, S is aperture stop, L1 is the first lens, L2 is the second lens, L3 is the third lens, and L4 is the fourth lens. Further, F is a parallel plate assuming elements including an optical low-pass filter, IR cut filter, and a seal glass of the solid-state image pickup element.

Figure 18:
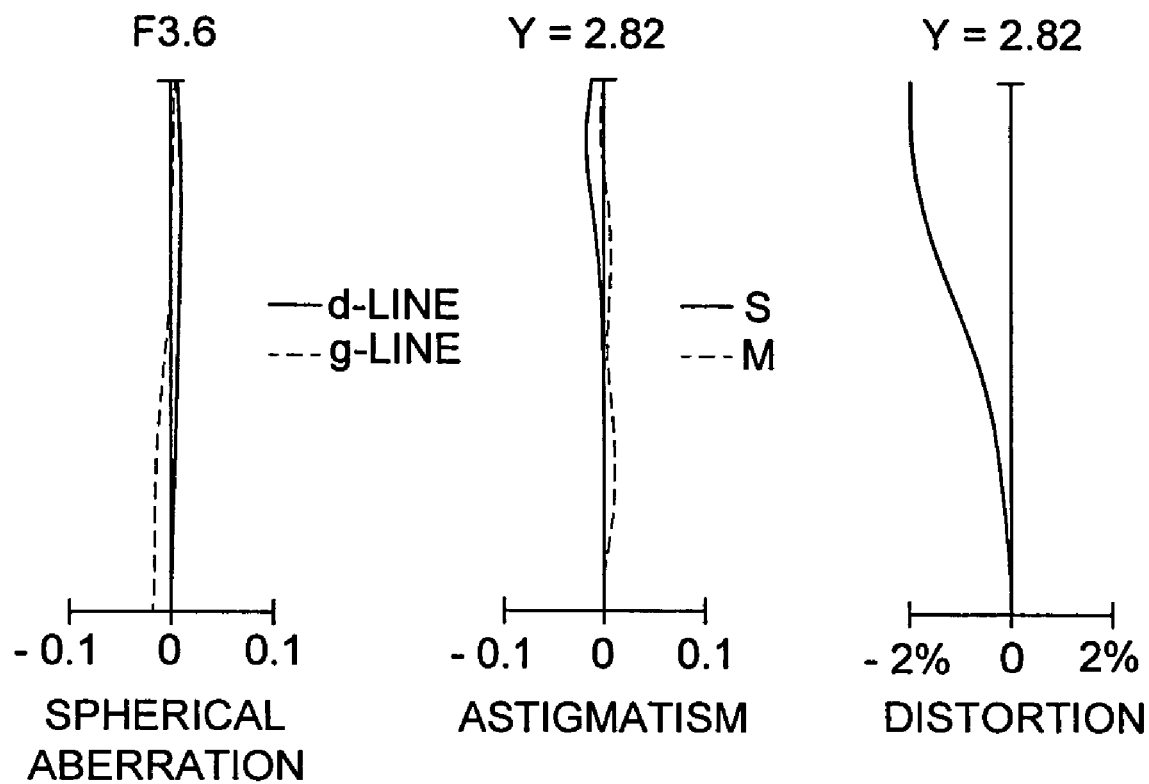
FIG. 18 is aberration views (spherical aberration, astigmatism, distortion, meridional coma) of the image pickup lens shown in Example 7.
Figure 18:
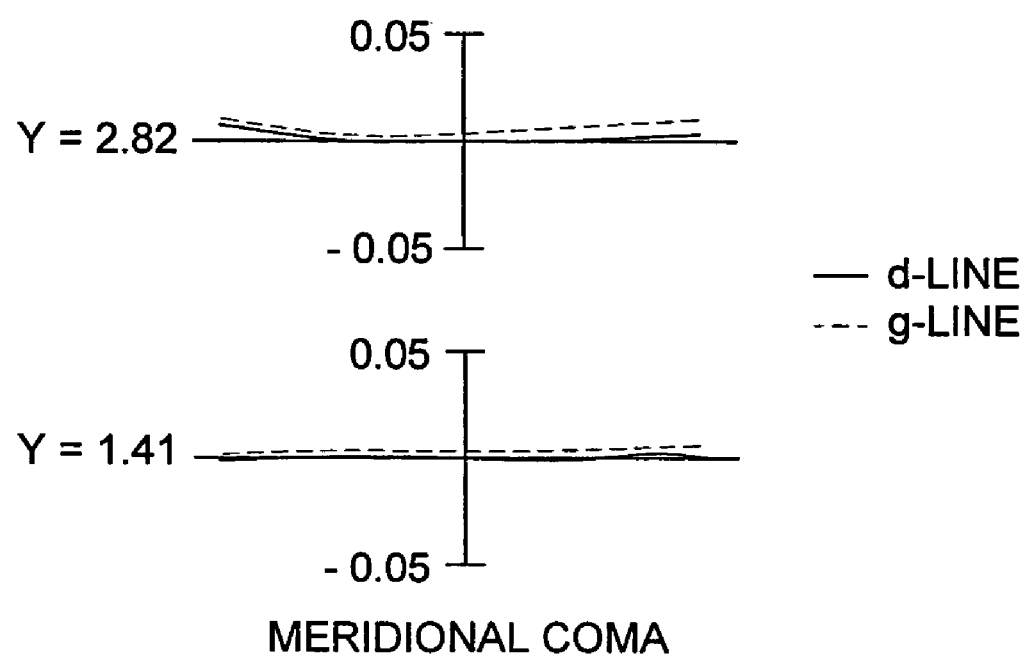

FIG. 18 is the aberration view (spherical aberration, astigmatism, distortion, meridional coma) of the image pickup lens shown in Example 7.

The first lens is a glass lens and the second and the fourth lens are formed of plastic lens of the polycarbonate system, whose saturation water absorption coefficient is 0.4%. The third lens is formed of the plastic lens of polyolefin system whose saturation water absorption coefficient is less than 0.01%.

For the image pickup element, 1/3.2 of inch type, pixel pitch of 2.2 μm, 2048×1536 of pixels are assumed.

Hereupon, the change of refractive index nd by the temperature of the plastic material will be shown in Table 21.

TABLE 21

| | Refractive index at normal temp. | Refractive index at normal temp. +30° C. |
|---|---|---|
| The 2nd lens, the 4th lens | 1.5830 | 1.5788 |
| The 3rd lens | 1.5318 | 1.5285 |

In the image pickup lens shown in Example 7, the image point position variation (which is back focus changing amount ($\Delta fB$)) when the temperature is raised by +30 (° C.) to the normal temperature 20 (° C.) is −0.0073 mm.

The focal depth on the image pickup element side assumed in Example 7 is ±0.0158 mm, and in contrast to this, the image point position variation amount to the focal depth amount in can be made to half or less of the focal depth in the image pickup lens in Example 7, and there is entirely no problem.

In the following Table 22, values corresponding to each expressions in above Examples 1 to 7 will be shown.

TABLE 22

| | | Example | | | | | | |
|---|---|---|---|---|---|---|---|---|
| | | 1 | 2 | 3 | 4 | 5 | 6 | 7 |
| (1) | $f_1/f$ | 1.16 | 1.17 | 0.91 | 1.15 | 1.47 | 1.05 | 0.94 |
| (2) | $f_3/f$ | 0.51 | 0.48 | 0.91 | 0.58 | 0.47 | 0.33 | 0.85 |
| (3) | $(R_3 + R_4)/(R_3 − R_4)$ | 0.69 | 0.53 | 0.85 | 1.66 | 1.90 | 0.10 | 0.61 |
| (4) | $R_8/f$ | 0.22 | 0.22 | 0.31 | 0.28 | 0.38 | 0.18 | 0.31 |

In the above Examples 1 to 7, the first lens is formed of the glass lens, the second lens and the fourth lens are formed of the plastic material of polycarbonate system, and the saturation water absorption coefficient is 0.4%. The third lens is formed of the plastic material of polyolefin system, and the saturation water absorption coefficient is less than 0.01%. Because the plastic lens has the larger saturation water absorption coefficient than the glass lens, when there is a sudden humidity change, the uneven distribution of the water absorption amount is transiently generated, and the refractive index does not become uniform, and there is a tendency that the good image formation performance is not obtained. In order to suppress the performance deterioration by the humidity change, it is desirable that the plastic material whose saturation water absorption coefficient is all less than 0.7% is used.

Further, when the glass mold lens is used for the first lens, it is desirable that the glass material whose glass transition point (Tg) is less than 400° C., is used. Hereby, the consumption of the molding die can be prevented as much as possible, and the durability of the metallic die can be increased.

In the structure according to the present invention, in order to suppress the variation of the image point position of the total system of the image pickup lens by the temperature change, the positive first lens is formed of the glass lens, the second lens, the third lens and the fourth lens are formed of the plastic lens, and when the refractive powers of the plastic lens are distributed so that the variation of the image point position at the time of temperature change is in some degree cancelled out, the problem of the temperature characteristic is solved.

Hereupon, recently, it is found that the inorganic microparticles are mixed in the plastic material, and the temperature change of the refractive index of the plastic material can be suppressed small. Described in detail, when the microparticles are mixed in the transparent plastic material, the scattering of the light is generated and the transmission factor is lowered generally. So, it is difficult to use as the optical material. However, when the size of the microparticle is made smaller than the wavelength of the transmission light flux, the plastic material can be made so that the scattering is not practically generated.

In the plastic material, the refractive index is lowered when the temperature rises. However, the refractive index is increased when the temperature rises in the inorganic particles. Accordingly, when they are activated so that they are cancelled out each other by using both of these temperature dependability, it can be made so that the refractive index change is hardly generated. Specifically, when the inorganic particles has maximum diameter being smaller than 20 nanometer and a plastic material is a base material, the inorganic particles are dispersed in the plastic material. It makes the plastic material whose temperature dependability of the refractive index very low. For example, when the microparticles of niobium oxide ($Nb_2O_5$) is dispersed in acrylic, the refractive index change by the temperature change can be made small.

Also in the above Examples, the plastic material in which such an inorganic particles are dispersed can also be used. The image point position variation of the image pickup lens whole system at the time of temperature change can also be suppressed small.

Further, the above plastic material in which the inorganic microparticles are dispersed can be used for the first lens in addition to the second lens, the third lens and the fourth lens. By distributing refractive power to each of the lenses so as to cancel out the image point position variation when the temperature changes, the image point position variation of the total system of the image pickup lens when the temperature changes can be suppressed to be smaller value.

Herein, a plastic materials where the microparticles with different refractive index change values according to temperature change can be use for each plastic lenses. At that time, by distributing refractive power to each of the lenses properly with considering effecting amounts to the image point position variation when the temperature changes of each of the lenses, the image point position variation of the total system of the image pickup lens when the temperature changes can be totally canceled.

Hereupon, each of structures in the above Examples is not necessarily designed such that the principal ray incident angle of the light flux entering into the image pickup surface of the solid-state image pickup element is sufficiently small in the image pickup surface peripheral part. However, in the recent technology, it becomes to realize that the shading can be lightened by reviewing the arrangement of the color filter of the image pickup element or on-chip micro lens array. Specifically, the pitch of the arrangement of the color filter or on-chip micro lens array is set slightly small for the pixel pitch of the image pickup surface of the image pickup element. So, the color filter or on-chip micro lens array which is closer to the peripheral part of the image pickup surface, is shifted larger to the optical axis side of the image pickup lens for each pixel. Therefore, the obliquely incident light flux can be effectively guided to the light receiving part of each pixel. Hereby, the shading generated in the solid-state image pickup element can be suppressed small.

What is claimed is:

1. An image pickup lens for forming a subject image on an photoelectric converter of a solid-sate image pickup element, comprising:
an aperture stop;
a first lens having a positive refractive power;
a second lens having a negative refractive power;
a third lens having a positive refractive power; and
a fourth lens having a negative refractive power,
wherein the aperture stop and the first to fourth lenses are arranged in this order from an object side of the image pickup lens,
the image pickup lens satisfies $0.8 < f_1/f < 2.0$, and $0.3 < f_3/f < 1.5$, where $f_1$ is a focal length of the first lens,
$f_3$ is a focal length of the third lens, and
f is a focal length of a total system of the image pickup lens.

2. The image pickup lens of claim 1, wherein the first lens is formed of a glass material.

3. The image pickup lens of claim 1, wherein each of the second lens, the third lens, and the fourth lens is formed of a plastic material.

4. An image pickup apparatus, comprising:
a solid-sate image pickup element including a photoelectric converter; and
the image pickup lens of claim 1.

5. The image pickup apparatus of claim 4, further comprising:
a substrate to support the solid-state image pickup element;
a connecting terminal formed on the substrate for receiving or transmitting an electrical signal;
a casing formed of a shielding material, having an aperture for an incident light flux from an object side of the image pickup lens, and housing the image pickup lens, wherein the substrate, the image pickup lens, and the casing are formed in one body, and a height of the image pickup apparatus along an optical axis of the image pickup lens is 10 mm or less.

6. A mobile terminal comprising the image pickup apparatus of claim 4.

7. An image pickup lens for forming a subject image on an photoelectric converter of a solid-sate image pickup element, comprising:

an aperture stop;

a first lens having a positive refractive power;

a second lens having a negative refractive power;

a third lens having a positive refractive power; and a fourth lens having a negative refractive power, wherein the aperture stop and the first to fourth lenses are arranged in this order from an object side of the image pickup lens, the image pickup lens satisfies $0.8 < f_1/f < 2.0$, and $0 < (R_3+R_4)/(R_3-R_4) < 2.5$, where $f_1$ is a focal length of the first lens, f is a focal length of a total system of the image pickup lens, $R_3$ is a curvature radius of an object side surface of the second lens, and $R_4$ is a curvature radius of an image side surface of the second lens.

8. The image pickup lens of claim 7, wherein the first lens is formed of a glass material.

9. The image pickup lens of claim 7, wherein each of the second lens, the third lens, and the fourth lens is formed of a plastic material.

10. An image pickup apparatus, comprising:

a solid-sate image pickup element including a photoelectric converter; and the image pickup lens of claim 7.

11. The image pickup apparatus of claim 10, further comprising:

a substrate to support the solid-state image pickup element;

a connecting terminal formed on the substrate for receiving or transmitting an electrical signal;

a casing formed of a shielding material, having an aperture for an incident light flux from an object side of the image pickup lens, and housing the image pickup lens, wherein the substrate, the image pickup lens, and the casing are formed in one body, and a height of the image pickup apparatus along an optical axis of the image pickup lens is 10 mm or less.

12. A mobile terminal comprising the image pickup apparatus of claim 10.

13. An image pickup lens for forming a subject image on an photoelectric converter of a solid-sate image pickup element, comprising:

an aperture stop;

a first lens having a positive refractive power;

a second lens having a negative refractive power;

a third lens having a positive refractive power; and a fourth lens having a negative refractive power, wherein the aperture stop and the first to fourth lenses are arranged in this order from an object side of the image pickup lens, and the image pickup lens satisfies $0.8 < f_1/f < 2.0$, and $0.15 < R_8/f < 0.5$, where $f_1$ is a focal length of the first lens, $R_8$ is a curvature radius of an image side surface of the fourth lens, and f is a focal length of a total system of the image pickup lens.

14. The image pickup lens of claim 13, wherein the first lens is formed of a glass material.

15. The image pickup lens of claim 13, wherein each of the second lens, the third lens, and the fourth lens is formed of a plastic material.

16. An image pickup apparatus, comprising:

a solid-sate image pickup element including a photoelectric converter; and the image pickup lens of claim 13.

17. The image pickup apparatus of claim 16, further comprising:

a substrate to support the solid-state image pickup element;

a connecting terminal formed on the substrate for receiving or transmitting an electrical signal;

a casing formed of a shielding material, having an aperture for an incident light flux from an object side of the image pickup lens, and housing the image pickup lens, wherein the substrate, the image pickup lens, and the casing are formed in one body, and a height of the image pickup apparatus along an optical axis of the image pickup lens is 10mm or less.

18. A mobile terminal comprising the image pickup apparatus of claim 16.

* * * * *